United States Patent

[11] 3,617,889

[72] Inventor Jacob Rabinowitz
New York, N.Y.
[21] Appl. No. 849,753
[22] Filed Aug. 13, 1969
[45] Patented Nov. 2, 1971
[73] Assignee RCA Corporation

[54] TIME-FREQUENCY-PHASE IN-BAND CODED COMMUNICATIONS SYSTEM
27 Claims, 17 Drawing Figs.

[52] U.S. Cl. .................................................. 325/30, 325/56, 325/161, 325/320, 178/66
[51] Int. Cl. .................................................. H04l 27/30, H04b 7/12
[50] Field of Search .................................................. 178/66, 67, 68; 325/30, 56, 161, 163, 320; 340/170, 171

[56] References Cited

UNITED STATES PATENTS

| | | | |
|---|---|---|---|
| 3,292,147 | 12/1966 | Dascotte | 178/66 |
| 3,384,822 | 5/1968 | Miyagi | 178/66 |
| 3,404,229 | 10/1968 | Downey et al. | 325/30 |
| 3,409,831 | 11/1968 | Walker | 178/66 |
| 3,445,593 | 5/1969 | Gray et al. | 178/67 |
| 3,485,949 | 12/1969 | DeHaas | 178/67 |
| 3,493,866 | 2/1970 | Miller | 325/30 |

*Primary Examiner*—Robert L. Griffin
*Assistant Examiner*—James A. Brodsky
*Attorney*—E. J. Norton

ABSTRACT: A communication system which uses a diversity technique to overcome problems of signal fading and multipath distortion. Frequency shift keying (FSK) and differential phase shift keying (DPSK) are employed in combination to code a sequence of signals responsive to a word represented by a stream of input binary digits. The sequences of signals to be transmitted are arranged such that identification of the frequency, phase shift and location of one signal in the sequence uniquely defines the input word.

SEQUENCE INFORMATION COMPONENT

| INPUT DATA BIT 1 | INPUT DATA BIT 2 | FREQUENCY ORDER T1 | T2 | T3 | T4 | SEQUENCE |
|---|---|---|---|---|---|---|
| 0 | 0 | $F_1$ | $F_2$ | $F_3$ | $F_4$ | = $S_1$ |
| 0 | 1 | $F_4$ | $F_3$ | $F_2$ | $F_1$ | = $S_2$ |
| 1 | 0 | $F_3$ | $F_1$ | $F_4$ | $F_2$ | = $S_3$ |
| 1 | 1 | $F_2$ | $F_4$ | $F_1$ | $F_3$ | = $S_4$ |

$T_1$ $T_2$ $T_3$ $T_4$

DIFFERENTIAL PHASE SHIFT INFORMATION COMPONENT

| INPUT DATA BIT 3 | INPUT DATA BIT 4 | SUBCARRIER PHASE CHANGE |
|---|---|---|
| 0 | 0 | 0° |
| 0 | 1 | 90° |
| 1 | 1 | 180° |
| 1 | 0 | 270° |

INVENTOR.
Jacob Rabinowitz
BY
Edward J. Norton
ATTORNEY

| IF SUBCARRIER | | REPRESENTATION | EXPANSION | IN-PHASE | QUADRATURE |
|---|---|---|---|---|---|
| FRE-QUENCY | PHASE | | | SIN $\omega_C t$ | COS $\omega_C t$ |
| $F_1$ | 0° | $\text{SIN}(\omega_C-3\omega_M)t$ | $\text{SIN}\,\omega_C t\,\text{COS}\,3\omega_M t-\text{COS}\,\omega_C t\,\text{SIN}\,3\omega_M t$ | $\text{SIN}(3\omega_M t+90°)$ | $\text{SIN}(3\omega_M t+180°)$ |
| $F_1$ | 90° | $\text{COS}(\omega_C-3\omega_M)t$ | $\text{COS}\,\omega_C t\,\text{COS}\,3\omega_M t+\text{SIN}\,\omega_C t\,\text{SIN}\,3\omega_M t$ | $\text{SIN}(3\omega_M t+0°)$ | $\text{SIN}(3\omega_M t+90°)$ |
| $F_1$ | 180° | $-\text{SIN}(\omega_C-3\omega_M)t$ | $-\text{SIN}\,\omega_C t\,\text{COS}\,3\omega_M t+\text{COS}\,\omega_C t\,\text{SIN}\,3\omega_M t$ | $\text{SIN}(3\omega_M t+270°)$ | $\text{SIN}(3\omega_M t+0°)$ |
| $F_1$ | 270° | $-\text{COS}(\omega_C-3\omega_M)t$ | $-\text{COS}\,\omega_C t\,\text{COS}\,3\omega_M t-\text{SIN}\,\omega_C t\,\text{SIN}\,3\omega_M t$ | $\text{SIN}(3\omega_M t+180°)$ | $\text{SIN}(3\omega_M t+270°)$ |
| $F_2$ | 0° | $\text{SIN}(\omega_C-\omega_M)t$ | $\text{SIN}\,\omega_C t\,\text{COS}\,\omega_M t-\text{COS}\,\omega_C t\,\text{SIN}\,\omega_M t$ | $\text{SIN}(\omega_M t+90°)$ | $\text{SIN}(\omega_M t+180°)$ |
| $F_2$ | 90° | $\text{COS}(\omega_C-\omega_M)t$ | $\text{COS}\,\omega_C t\,\text{COS}\,\omega_M t+\text{SIN}\,\omega_C t\,\text{SIN}\,\omega_M t$ | $\text{SIN}(\omega_M t+0°)$ | $\text{SIN}(\omega_M t+90°)$ |
| $F_2$ | 180° | $-\text{SIN}(\omega_C-\omega_M)t$ | $-\text{SIN}\,\omega_C t\,\text{COS}\,\omega_M t+\text{COS}\,\omega_C t\,\text{SIN}\,\omega_M t$ | $\text{SIN}(\omega_M t+270°)$ | $\text{SIN}(\omega_M t+0°)$ |
| $F_2$ | 270° | $-\text{COS}(\omega_C-\omega_M)t$ | $-\text{COS}\,\omega_C t\,\text{COS}\,\omega_M t-\text{SIN}\,\omega_C t\,\text{SIN}\,\omega_M t$ | $\text{SIN}(\omega_M t+180°)$ | $\text{SIN}(\omega_M t+270°)$ |
| $F_3$ | 0° | $\text{SIN}(\omega_C+\omega_M)t$ | $\text{SIN}\,\omega_C t\,\text{COS}\,\omega_M t+\text{COS}\,\omega_C t\,\text{SIN}\,\omega_M t$ | $\text{SIN}(\omega_M t+90°)$ | $\text{SIN}(\omega_M t+0°)$ |
| $F_3$ | 90° | $\text{COS}(\omega_C+\omega_M)t$ | $\text{COS}\,\omega_C t\,\text{COS}\,\omega_M t-\text{SIN}\,\omega_C t\,\text{SIN}\,\omega_M t$ | $\text{SIN}(\omega_M t+180°)$ | $\text{SIN}(\omega_M t+90°)$ |
| $F_3$ | 180° | $-\text{SIN}(\omega_C+\omega_M)t$ | $-\text{SIN}\,\omega_C t\,\text{COS}\,\omega_M t-\text{COS}\,\omega_C t\,\text{SIN}\,\omega_M t$ | $\text{SIN}(\omega_M t+270°)$ | $\text{SIN}(\omega_M t+180°)$ |
| $F_3$ | 270° | $-\text{COS}(\omega_C+\omega_M)t$ | $-\text{COS}\,\omega_C t\,\text{COS}\,\omega_M t+\text{SIN}\,\omega_C t\,\text{SIN}\,\omega_M t$ | $\text{SIN}(\omega_M t+0°)$ | $\text{SIN}(\omega_M t+270°)$ |
| $F_4$ | 0° | $\text{SIN}(\omega_C+3\omega_M)t$ | $\text{SIN}\,\omega_C t\,\text{COS}\,3\omega_M t+\text{COS}\,\omega_C t\,\text{SIN}\,3\omega_M t$ | $\text{SIN}(3\omega_M t+90°)$ | $\text{SIN}(3\omega_M t+0°)$ |
| $F_4$ | 90° | $\text{COS}(\omega_C+3\omega_M)t$ | $\text{COS}\,\omega_C t\,\text{COS}\,3\omega_M t-\text{SIN}\,\omega_C t\,\text{SIN}\,3\omega_M t$ | $\text{SIN}(3\omega_M t+80°)$ | $\text{SIN}(3\omega_M t+90°)$ |
| $F_4$ | 180° | $-\text{SIN}(\omega_C+3\omega_M)t$ | $-\text{SIN}\,\omega_C t\,\text{COS}\,3\omega_M t-\text{COS}\,\omega_C t\,\text{SIN}\,3\omega_M t$ | $\text{SIN}(3\omega_M t+270°)$ | $\text{SIN}(3\omega_M t+180°)$ |
| $F_4$ | 270° | $-\text{COS}(\omega_C+3\omega_M)t$ | $-\text{COS}\,\omega_C t\,\text{COS}\,3\omega_M t+\text{SIN}\,\omega_C t\,\text{SIN}\,3\omega_M t$ | $\text{SIN}(3\omega_M t+0°)$ | $\text{SIN}(3\omega_M t+270°)$ |
| 1 | 2 | 3 | 4 | 5 | 6 |

Fig. 3.

INVENTOR.
Jacob Rabinowitz
BY Edward J. Norton
ATTORNEY

INVENTOR.
Jacob Rabinowitz
BY
Edward J. Norton
ATTORNEY

INVENTOR
Jacob Rabinowitz
BY
Edward J. Norton
ATTORNEY

INVENTOR.
Jacob Rabinowitz
BY
Edward J. Norton
ATTORNEY

INVENTOR
Jacob Rabinowitz
BY
Edward J. Norton
ATTORNEY

GATE CONTROL MATRIX TRUTH TABLE

| 0° | 90° | 180° | 270° | $F_1$ | $F_2$ | $F_3$ | $F_4$ | ANALOG SWITCH ACTIVITY |
|---|---|---|---|---|---|---|---|---|
| 1 | 0 | 0 | 0 | 1 | 0 | 0 | 0 | Q-4=1, I-7=1 |
| 1 | 0 | 0 | 0 | 0 | 1 | 0 | 0 | Q-2=1, I-5=1 |
| 1 | 0 | 0 | 0 | 0 | 0 | 1 | 0 | Q-1=1, I-5=1 |
| 1 | 0 | 0 | 0 | 0 | 0 | 0 | 1 | Q-3=1, I-7=1 |
| 0 | 1 | 0 | 0 | 1 | 0 | 0 | 0 | Q-7=1, I-3=1 |
| 0 | 1 | 0 | 0 | 0 | 1 | 0 | 0 | Q-5=1, I-1=1 |
| 0 | 1 | 0 | 0 | 0 | 0 | 1 | 0 | Q-5=1, I-2=1 |
| 0 | 1 | 0 | 0 | 0 | 0 | 0 | 1 | Q-7=1, I-4=1 |
| 0 | 0 | 1 | 0 | 1 | 0 | 0 | 0 | Q-3=1, I-8=1 |
| 0 | 0 | 1 | 0 | 0 | 1 | 0 | 0 | Q-1=1, I-6=1 |
| 0 | 0 | 1 | 0 | 0 | 0 | 1 | 0 | Q-2=1, I-6=1 |
| 0 | 0 | 1 | 0 | 0 | 0 | 0 | 1 | Q-4=1, I-8=1 |
| 0 | 0 | 0 | 1 | 1 | 0 | 0 | 0 | Q-8=1, I-4=1 |
| 0 | 0 | 0 | 1 | 0 | 1 | 0 | 0 | Q-6=1, I-2=1 |
| 0 | 0 | 0 | 1 | 0 | 0 | 1 | 0 | Q-6=1, I-1=1 |
| 0 | 0 | 0 | 1 | 0 | 0 | 0 | 1 | Q-8=1, I-3=1 |

INVENTOR.
Jacob Rabinowitz
BY
Edward J. Norton
ATTORNEY

INVENTOR
Jacob Rabinowitz
BY
Edward J. Norton
ATTORNEY

INVENTOR.
Jacob Rabinowitz
BY
Edward J. Norton
ATTORNEY

INVENTOR.
BY Jacob Rabinowitz
Edward J Norton
ATTORNEY

INVENTOR.
Jacob Rabinowitz
BY
Edward J. Norton
ATTORNEY

INVENTOR.
Jacob Rabinowitz
BY
Edward J. Norton
ATTORNEY

TIME-FREQUENCY-PHASE IN-BAND CODED COMMUNICATIONS SYSTEM

BACKGROUND OF THE INVENTION

The present invention relates to communications systems in general and is particularly useful in connection with, but not limited to, those systems which are susceptible to loss of information by signal fading and multipath distortion. Systems subject to these conditions require special techniques to lower the error rate and thereby improve the reliability of communication.

One of the techniques known in the prior art for improving the reliability of communications is space diversity. The space diversity technique utilizes a plurality of receiver-antenna stations separated from each other so that multipath distortion due to changes in the transmission medium and signal fading due to interference will affect the several receiver-antenna stations differently.

Another common technique for minimizing multipath and fading effects is the utilization of a switched frequency diversity system. In this type of system the transmitter sends, together with the message signal, sounding pulses or tones, on other carrier frequencies, which enable the receiver to determine which carrier frequency is strongest and to then direct the transmitter, by return path, to switch to this frequency until such time as some other frequency becomes more desirable, that is, less subject to multipath distortion or fading.

Still another technique developed to overcome these problems is frequency diversity. This technique utilizes a plurality of transmitters operating on widely separated carrier frequencies. The wide frequency separation results in very low correlation of the fading of the separate carriers.

Inband coding systems have also been used to improve the reliability of communications. These systems transmit information in groups of symbol-representing signals, in a redundant fashion, so that reception of less than all of the symbols in a group is enough to identify the transmitted information. In all of the known inband coding systems, less than all of the transmitted symbols is sufficient for complete information retrieval but reception of a plurality of the symbols is still required.

The prior art approaches to multipath distortion and fading problems have focused on a variety of diversity techniques. That is, they try to provide a number of opportunities to correctly identify a single unit of information in the face of changing conditions of the transmission medium and changing levels of signal strength. However, the prior art systems mentioned above have several inherent problems in their various approaches. One such problem is excessive bandwidth. This problem arises whenever the widely separated carrier frequency technique is employed. Another problem which arises in the space-diversity and frequency diversity systems is the need for several units of the same equipment.

An object of the present invention is to achieve the highest potential diversity by employing a code which may be transmitted by a single transmitter and which may be received at one or more receiving stations, and wherein the signal waves transmitted need not be at widely separated carrier frequencies.

SUMMARY

As herein described, there is provided a communications system which transmits a plurality of transmission signal waves, each at a different frequency in response to an input signal which contains a sequence information component and a differential phase shift information component. The sequence information component of the input signal determines in which sequence, of a number of predetermined sequences, signal waves are to be transmitted. The predetermined sequences are arranged such that the location of a signal wave at a particular frequency in a sequence uniquely determines the sequence and therefore uniquely determines the sequence information component of the input signal. The signal waves in each sequence have a differential phase shift which is determined by the differential phase shift information component. The differential phase shift applied to each of said signal waves is relative to the phase of the signal wave of corresponding frequency in a previous sequence. When the differential phase shift of a signal wave at a particular frequency is determined with respect to two successive sequences, the differential phase shift information component then is uniquely defined. Therefore, correct identification of the location of a signal wave at a particular frequency in a sequence and the differential phase shift of the signal wave with respect to the phase of the signal wave at the same frequency in the previous sequence provides sufficient information to uniquely determine the input signal. In the drawings:

FIG. 3 is a table showing the manner in which the transmission signal waves are generated;

Figure 15:
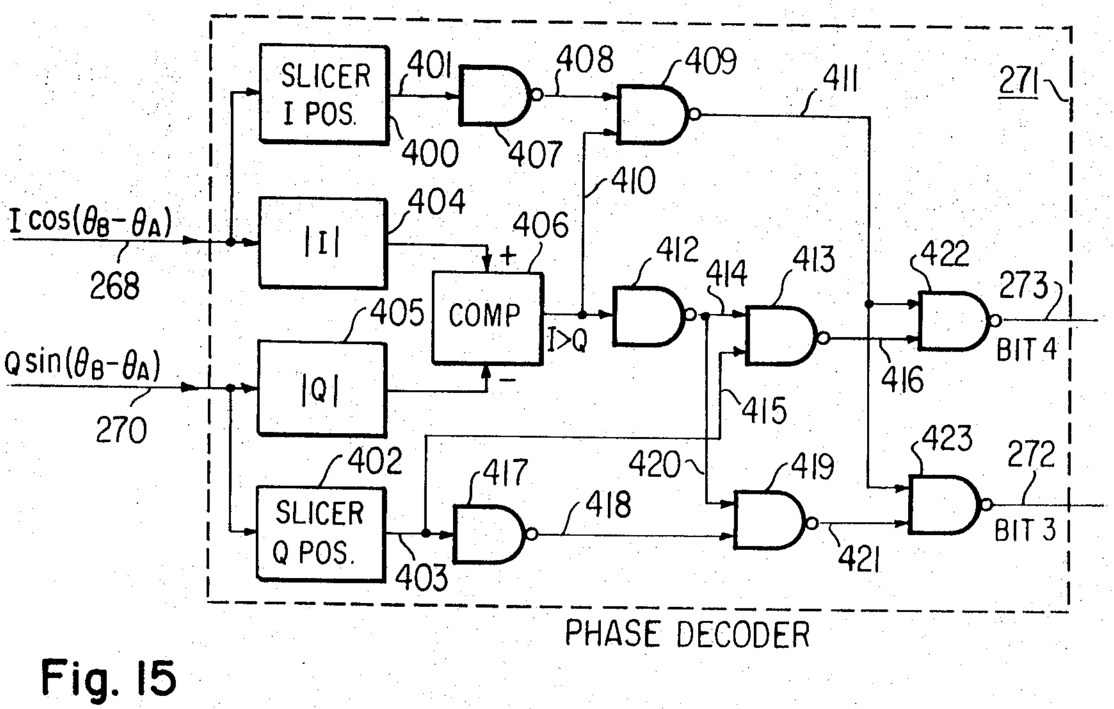

FIGS. 14 a and b are a detailed block diagram of the phase detection system of the demodulator;

FIG. 15 is a block diagram of the phase decoder of the demodulator; and

Figure 16:
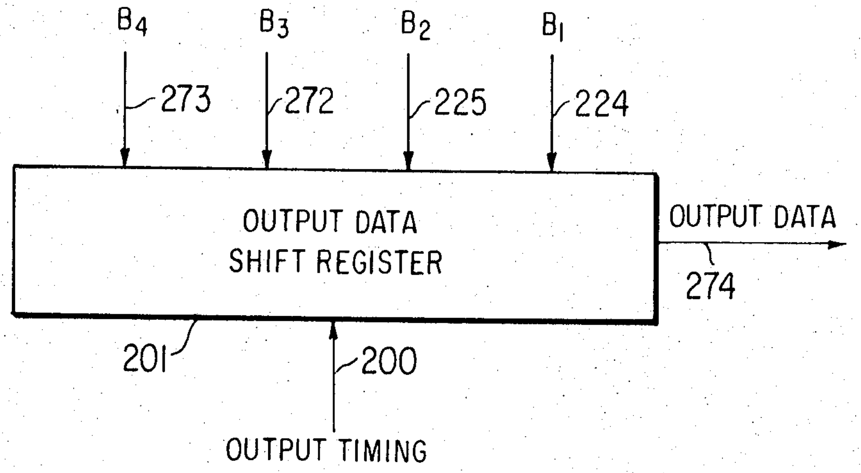

FIG. 16 is a block diagram of the output data register of the demodulator.

DETAILED DESCRIPTION

In response to an input data signal representing a selected one of 16 words, the system hereafter described transmits a train of four pulses of mutually different frequencies, arranged in a selected one of four sequences, so that the combination of transmitted sequence and the differential phase shift of each pulse train (with reference to the previously transmitted pulse train) uniquely corresponds to the word which the input data signal represents.

Figures 1, 2, 4:
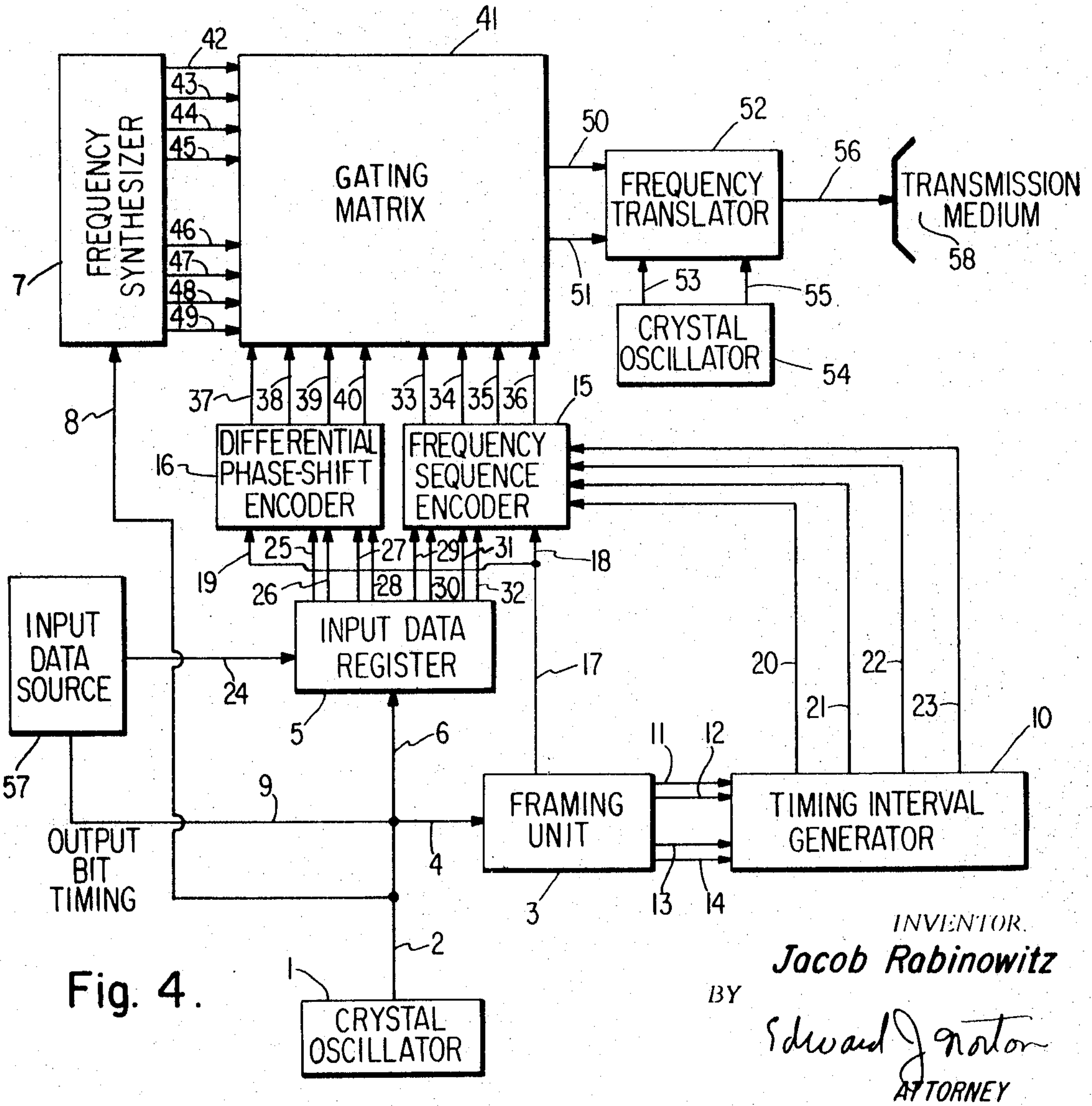
FIG. 1 is a table showing the sequence information component of the input signal and the corresponding permissible arrangements of transmission signal waves.
FIG. 2 is a table showing the differential phase shift information component of the input signal and the corresponding changes in the phase of successive transmission signal waves.
FIG. 4 is a block diagram of the modulator located at the transmitting station.

Referring now to Figures 1 and 2, the input data signal comprises a series of four pulses, each pulse corresponding to a binary digit. The first two binary digits of the input signal correspond to the sequence information component thereof. There are four unique combinations of the "0" and "1" levels of bits one and two. Each combination thereof corresponds to a particular sequence of transmission signal waves which are to be generated. There are four transmission signal waves, each at a distinct frequency, $R_1$, $F_2$, $F_3$, or $F_4$.

The transmission signal waves are arranged in one of four permissible sequences $S_1$, $S_2$, $S_3$, or $S_4$ for transmission. Each of the frequencies is used once and only once in any sequence.

The four sequences are selected such that the relative position within a sequence of a transmission signal wave at a particular frequency provides enough information to uniquely identify the entire sequence and therefore to uniquely identify the sequence information component of the input data signal. For example, the transmission signal wave at the frequency $F_4$ appears in location $T_3$ only in sequence $S_3$. Therefore, identification of $F_4$ in location $T_3$ provides enough information upon reception to determine that a "1" and a "0" are the first two bits of the input data signal.

Likewise, the second two pulses of the input data signal correspond to binary digits and comprise the differential phase shift information component thereof. There are four combinations of the "0" and "1" levels of bits 3 and 4. Each combination corresponds to a specified differential phase shift to be applied to successive transmission signal waves of the same frequency. Preferably, differential phase shifts of 0°, 90°, 180°, and 270° may be selected. Whereas the phase difference between successive transmission signal waves of the same frequency is preferably utilized, a fixed reference phase may alternatively be used to determine differential phase shift. However, the latter method requires a high degree of reference oscillator phase stability as well as some form of phase locking between the transmitting station and the receiving station. The same differential phase shift (corresponding to a particular combination of bits three and four of the input signal) is preferably applied to all of the transmission signal waves in the particular sequence to be transmitted.

The transmission signal waves which are generated appear as single-sideband signal waves resulting from the modulation of a carrier frequency with a fundamental or the third harmonic of a modulating signal. However, the usual technique of filtering and suppressing the unwanted sideband in a single-sideband system is not employed here. In the present system the single-sideband transmission signal wave is synthesized from its mathematical component parts. The appropriate structure is implemented to provide the mathematical component parts of the transmission signal wave such that when the components are added together the resulting signal wave corresponds to the desired single-sideband signal wave to be transmitted.

Columns 1 and 2 of Figure 3 show the frequency and phase of the transmission signal waves. Column 3 shows the trigonometric representation of the transmission signal waves. Column 4 shows the representations of column 3 in their respective equivalent trigonometric expansions. Column 5 shows the equivalent sine expression for that portion of the expansion in column 4 which multiplies the sine of the carrier frequency $\omega_c$. Likewise, column 6 shows the equivalent sine expression for that portion of column 4 which multiplies the cosine of the carrier frequency, $\omega_c$.

For example, in line 1 of Fig. 3, the method for generating a transmission signal wave at a frequency $F_1$ and an absolute phase of 0° is shown. A transmission signal wave at $F_1$ and 0° is represented by:

$$\text{Sin}\ (\omega_c - 3\omega_m)t.$$

This representation may be trigonometrically expanded to:

$$\text{Sin}\ \omega_c t\ \text{Cos}\ 3\omega_m t - \text{Cos}\ \omega ct\ \text{Sin}\ 3\ \omega_m t$$

Utilizing the trigonometric equivalents as follows, $$\cos 3\omega_m t = \sin (3\omega_m t + 90°) \text{ and;}$$

$$\sin 3\ \omega_m t = \sin (3\omega_m t + 180°),$$

the appropriate expressions for multiplying the sine and cosine of the carrier frequency are obtained. These expressions are entered in columns 5 and 6 respectively. The results expressed in columns 5 and 6 at line 1 show that in order to generate the transmission signal wave at a frequency of $F_1$ and a relative phase of 0°, a reference signal wave $\sin (3\omega_m t + 90°)$ must be provided and then multiplied by the in-phase carrier signal wave $\sin \omega ct$.

Furthermore, a reference signal wave $\sin (3\omega_m t + 180°)$ must be provided and then multiplied by the quadrature phase carrier signal wave $\text{Cos}\ \omega ct$. When the two products, $\sin \omega ct \sin (3\omega_m t + 90°)$ and $\cos \omega ct \sin (3\omega_m t + 180°)$; are added together they combine to form the desired transmission signal wave.

In like manner, Figure 3 shows component signal waves necessary for generating all of the required transmission signal waves.

The block diagram of Figure 4 shows the manner in which the coding techniques discussed above are implemented. A crystal oscillator 1 generates a square wave on line 2 to provide all the necessary timing signals for the transmitter. The square wave is conveyed from line 2 to a framing unit 3 on line 4, an input data register 5 on line 6, a frequency synthesizer 7 on line 8. The crystal oscillator 1 also provides the output timing signal from line 2 to the input data source 57 via line 9.

The framing unit 3 processes the square wave on line 4 to provide the necessary square wave signals to a timing interval generator 10 via lines 11 to 14. The framing unit 3 also provides a timing signal to a frequency encoder 15 and a differential phase shift encoder 16 via lines 17, 18 and 19.

The timing interval generator 10 processes the square wave signals on lines 11–14 to provide a pulse on each of lines 20, 21, 22 and 23, these pulses correspond to the bit time intervals in which the transmission signal waves are to be transmitted.

The input data signal corresponding to the stream of binary digits is delivered to input data register 5 via line 24. The data is shifted out of the data register 5 and delivered to the differential phase shift encoder 16 via lines 25 thru 28 and to the frequency sequence encoder 15 via lines 29 thru 32.

The frequency sequence encoder 15 responds to the first two bits of the input signal translated through lines 29–32 and to the timing interval pulses arriving on lines 20–23 to provide frequency control pulses on lines 33–36.

Each one of the lines 33–36 carries a frequency control pulse which corresponds to one of the four frequencies of the transmission signal waves. The frequency control pulses are arranged in a time sequence corresponding to the sequence of transmission signal waves designated by bits one and two of the input data signal.

The differential phase shift encoder 16 responds to the second two bits of the input data signal which has been translated via lines 25–28 to provide a differential phase shift control pulse on a selected one of the output lines 37–40. Each one of the lines 37–40 corresponds to one of the four differential phase shifts, , 90°, 180° or 270°, designated by the second two bits.

The frequency synthesizer 7 processes the square wave on line 8 to provide the fundamental and third harmonic of the square wave frequency from line 8, each frequency being provided at phase angles of 0°, 90°, 180° and 270°. These reference signal waves are the signals which appear in columns 5 and 6 of Figure 3. The reference signal waves are provided at a gating matrix 41 via lines 42–45 for the fundamental frequency and lines 46–49 for the third harmonic frequency.

The gating matrix 41 responds to the frequency control pulses on lines 33–36 and the differential phase shift control pulses on lines 37–40 to couple the appropriate reference signal waves to lines 50 and 51.

In order to provide the functions described in columns 5 and 6, the reference signal waves on lines 50 and 51 are translated by a frequency translator 52 which multiplies the appropriate reference signal wave on line 50 with a sine wave at the carrier frequency entering the frequency translator 52 on line 53 from a crystal oscillator 54. Likewise, the appropriate reference signal wave on line 51 is multiplied in the frequency translator 52 by a cosine wave at the carrier frequency on line 55 from the crystal oscillator 54. The product of the signals on lines 50 and 53 and the product of the signals on lines 51 and 55 are added in the frequency translator 52 and transferred from the frequency translator 52 at an output terminal 56 to the transmission medium 58.

Figure 5:
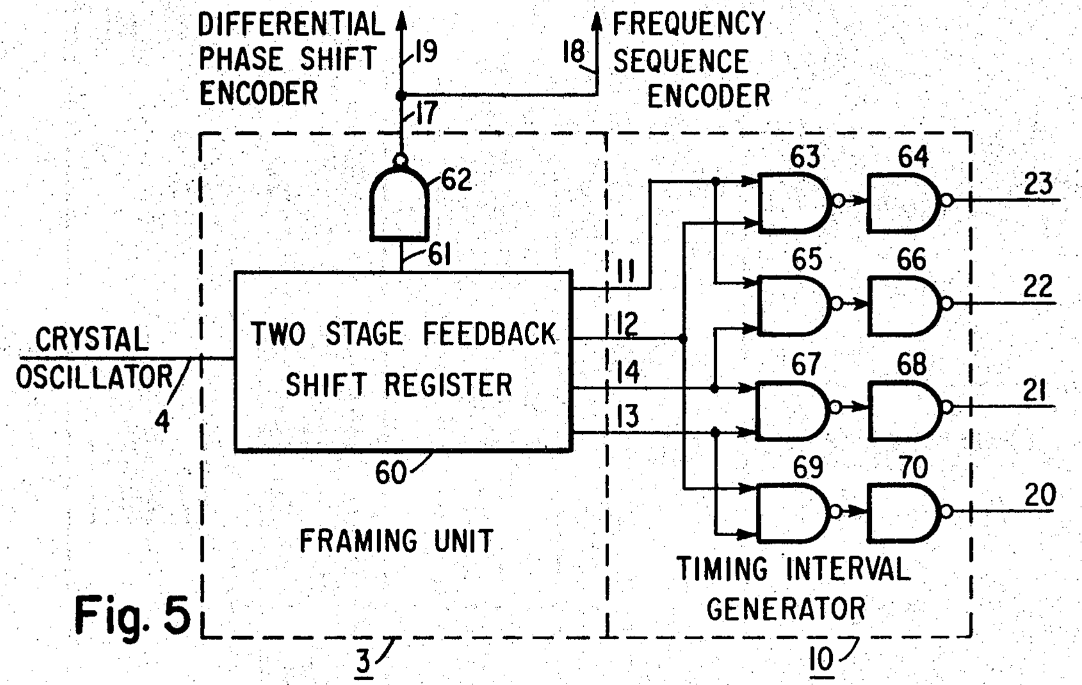
FIG. 5 is a block diagram of the modulator framing unit and the timing interval generator coupled thereto.

Figure 5 shows the pertinent details of the framing unit 3 and the timing interval generator 10. The framing unit 3 comprises a two stage feedback shift register 60 which accepts the square wave from the crystal oscillator 1 on line 4 and divides the frequency thereof by four to provide a square wave framing signal at line 61. The register 60 also provides the framing signal at four phases (0°, 90°, 180°, and 270°) at lines 11, 12, 13 and 14 respectively. An inverted square wave framing signal is obtained on line 17 by passing the framing signal on line 61 through an inverter 62. The inverted framing signal is delivered to the differential phase shift encoder 16 via line 19 and to the frequency sequence encoder 15 via line 18.

Figure 6:
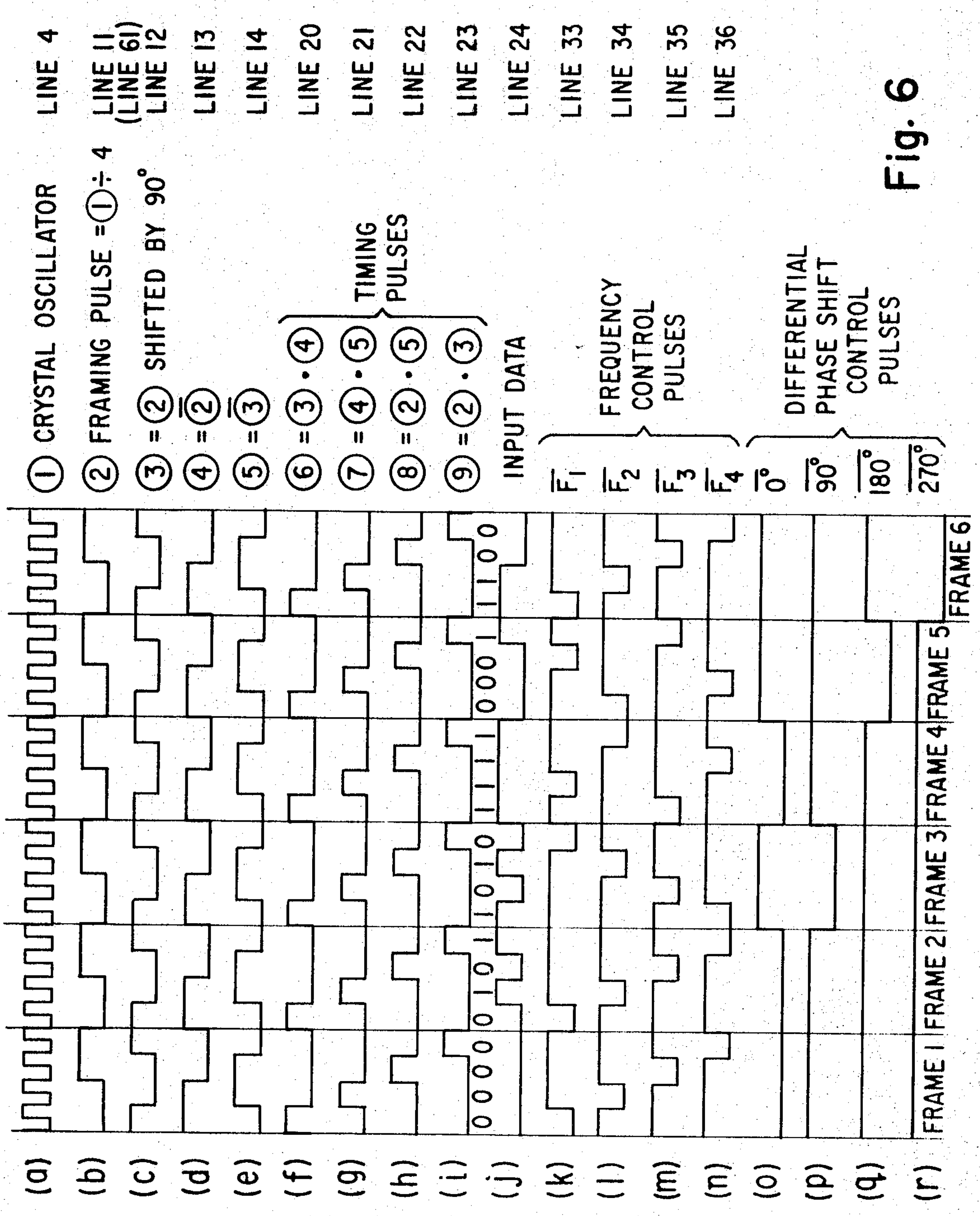
FIG. 6 is a timing diagram associated with the modulator located at the transmitting station.

Figure 6 should be referred to for an understanding of the output signals of the two stage feedback shift register 60. Figure 6(*a*) shows the incoming signal on line 4. Figure 6(*b*) shows the framing signal on lines 11 and 61 at one fourth the frequency of the incoming signal on line 4. Figures 6(*b*), (*c*), (*d*), and (*e*) show the framing signal shifted by 0°, 90°180°, and 270° respectively.

The timing interval generator 10 utilizes a series of gates to combine the several shifted framing signals to provide timing interval pulses on lines 20–23. The AND gate comprising NAND-gate 69 coupled to INVERTER 70 combines the signal on line 12 with the signal on line 13 to produce the pulse corresponding to time interval $T_1$ and appearing on line 20. The pulse waveform representing $T_1$ appears in Figure 6(*f*).. In a like manner NAND-gates 67, 65 and 63 are respectively coupled to INVERTERS 68, 66, and 64 to produce pulse waveforms corresponding to time intervals $T_2$, $T_3$ and $T_4$ which appear on lines 21, 22 and 23 respectively and are presented in FIGS. 6(*g*), 6(*h*) and 6(*i*).

Figure 7:
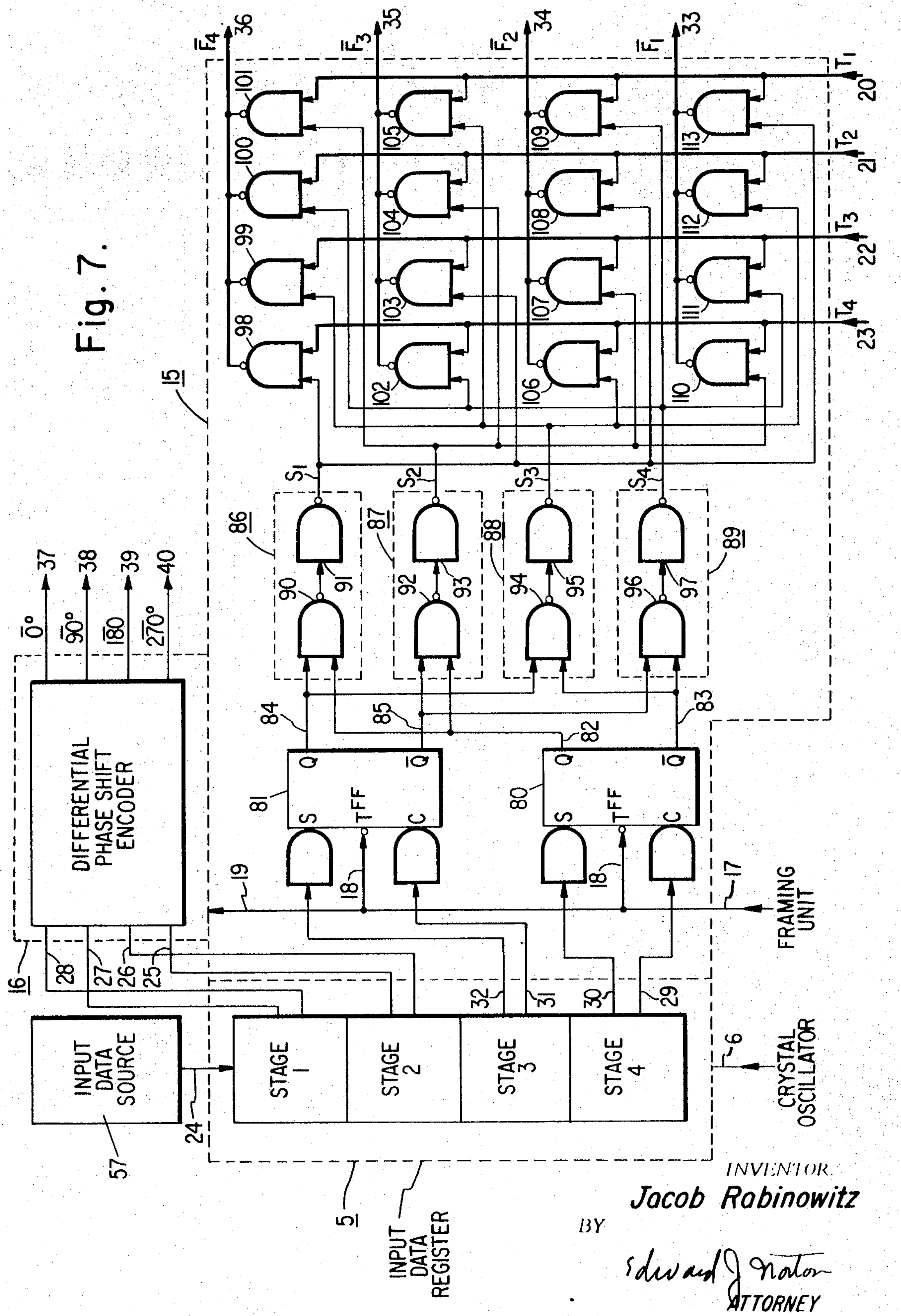
FIG. 7 is a block diagram of a portion of the modulator showing the input data register, the frequency sequence encoder and the differential phase shift encoder.

FIG. 7 shows how the input data signal from the data source 57 is processed to provide the frequency control pulses and the differential phase shift control pulses. The four bits are serially fed into a four stage input data shift register 5. The first bit is shifted into stage 1 of shift register 5 in the first bit time interval $T_1$. Bit one then is shifted to stage 2 and bit two is shifted into stage 1 at bit time interval $T_2$. The serial shifting continues in the input data register 5 until time $T_4$ when bit one is in stage 4, bit two is in stage three, bit three is in stage 2 and bit four is in stage 1. In the time interval succeeding $T_4$ the input data bits one, two, are shifted in parallel, out of data register 5 to the frequency sequence encoder 15. At the same time the data bits one and two are shifted out of data register 5, bits three and four of the input signal are shifted out, in parallel, to the differential phase shift encoder 16.

Bits one and two are transferred to flip-flops 80 and 81 respectively. Bit one is read into flip-flop 80 from lines 30 and 29 and coupled out from flip-flop 80 on lines 82 and 83. Bit two is read into flip-flop 81 from lines 32 and 31 and coupled out from flip-flop 81 on lines 84 and 85. Flip-flops 80 and 81 are used to hold the sequence information component contained in bits one and two at the AND-gates 86, 87, 88 and 89 for four bit time intervals. AND-gates 86, 87, 88 and 89 comprise NAND-gates 90, 92, 94 and 96 coupled to INVERTERS 91, 93, 95 and 97 respectively.

All digital circuit elements with the exception of the data source 57 operate in negative logic wherein binary "0" states are represented by high voltage levels and binary "1" states are represented by low voltage levels. A "0" state in flip-flop 80, corresponding to bit one, causes line 82 to go to a positive voltage level. Similarly, a "0" state in flip-flop 81, corresponding to bit 2, causes line 84 to go to a positive voltage level. With a "0" state in both flip-flops 80 and 81, a positive pulse appears at the output of AND-gate 86 which corresponds to the sequence indication pulse $S_1$. When flip-flop 80 is in a "0" state and flip-flop 81 is in a "1" state, a positive voltage pulse appears at the output of AND-gate 87 which corresponds to the sequence indication pulse $S_2$. When the proper states appear at flip-flop 80 and 81, sequence indication pulses $S_3$ and $S_4$ will appear at the outputs of AND-gates 88 and 89 respectively.

The sequence indication pulse appearing at the output of one of the AND-gates 86, 87, 88 or 89, depending upon the sequence information component contained in bits one and two of the input signal, appears for a duration of four bit time intervals and combines with the bit time interval pulses $T_1$, $T_2$, $T_3$, and $T_4$ entering the frequency encoder on lines 20, 21, 22, and 23 respectively to produce negative voltage frequency control pulses. The frequency control pulses are generated on lines 33, 34, 35 and 36 by gating the timing interval pulses and the sequence indication pulses through NAND-gates 98–113. Each frequency control pulse lasts for one bit time interval.

To illustrate the function of the frequency sequence encoder 15, assume the input signal from the data source 57 to be that shown in frame 5 of FIG. 6(*j*). In frame 5 the first two bits are "0" and "0" which, according to the table in Figure 1, corresponds to sequence $S_1$. During frame 5 this information is shifted through the data register 5. At the start of frame 6 the sequence indication pulse corresponding to $S_1$ appears at the output of AND-gate 86. At $T_1$ of frame 6 the sequence indication pulse and the timing interval pulse on line 20 are coincident at NAND-gate 113 and a negative frequency control pulse corresponding to frequency $F_1$ is provided on line 33 and lasts for the duration of the timing interval pulse on line 20. In a like manner the sequence indication pulse $S_1$ combines with the timing interval pulses on lines 21, 22 and 23 to produce frequency control pulses at the outputs of NAND-gates 108, 103 and 98 respectively corresponding to frequencies $F_2$, $F_3$, $F_4$. The frequency control pulses for $F_1$, $F_2$, $F_3$ and $F_4$ under the conditions described above are shown in frame 6 of FIG. 6 (*k*), (*l*), (*m*) and (*n*).

The differential phase shift encoder 16, shown in FIG. 7 provides two functions. First the phase shift encoder 16 stores the value of the differential phase shift control pulse from the previous frame which appeared on one of the lines 37–40 and then provides a differential phase shift control pulse, on one of the lines 37–40, to shift the phase of the next sequence of transmission signal waves by an amount corresponding to the differential phase shift information component which was stored in stages 2 and 1 of data register 5. This process is the known technique of differential phase shift keying (DPSK). The technique of differential phase shift keying is described in U.S. Pat. No. 3,099,795, issued July 30, 1963 and entitled "Phase Coded Communication System" and it is also described in U.S. Pat. No. 3,341,776, issued Sept. 12, 1967 and entitled "Error Sensitive Binary Transmission System Wherein Four Channels are Transmitted Via One Carrier Wave."

FIG. 6 includes an illustration of the function of the differential phase shift encoder 16. FIG. 6(*q*) shows a negative going pulse in frame 5 which indicates that all of the transmission signal waves transmitted during frame 5 had a phase angle of 180°. The differential phase shift information component in frame 5 shows a "0" and "1" level for bits three and four respectively which corresponds to a differential phase shift of 90°. The effect of the differential phase shift information component of frame 5 FIG. 6(*j*) is shown in frame 6 of FIG. 6(*r*). The transmission signal waves transmitted in frame 6 will have a phase angle of 270° as indicated by the differential phase shift control pulse in frame 6 FIG. 6(*r*).

Figure 8:
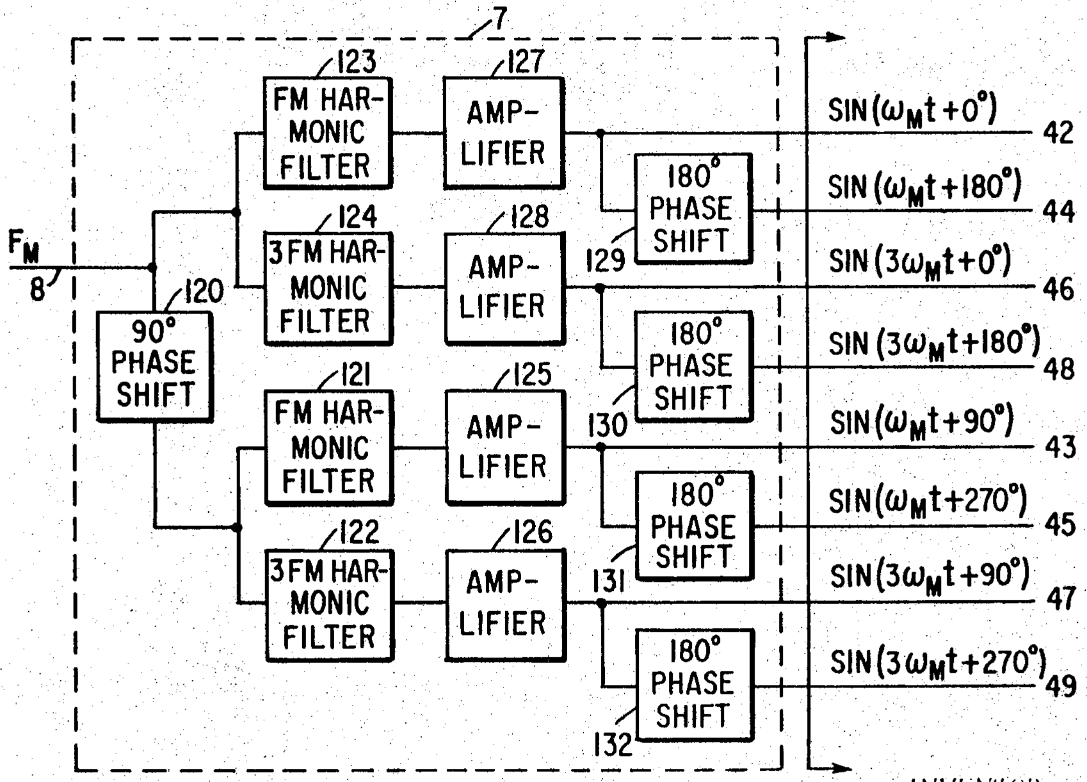
FIG. 8 is a block diagram of the modulator frequency synthesizer.

FIG. 8 illustrates the manner in which the reference signal waves appearing in columns 5 and 6 of FIG. 3 are generated. The square wave at frequency $F_m$ generated by the crystal oscillator 1 enters the frequency synthesizer circuit 7 via line 8. The square wave signal coming in one line 8 is tapped so that the square wave at the frequency $F_m$ is provided at a 90° phase shifter 120. The square wave at frequency $F_m$ and phase angle 90° is then provided at the input to a fundamental filter 121 and at the input to a third harmonic filter 122. The square wave at frequency $F_m$ and 0° phase angle is provided at the input to another fundamental filter 123 and another third harmonic filter 124.

The sine wave output signals from the filters 121–124 are then provided at amplifiers 125–128 respectively. The gains of amplifiers 125–128 are adjusted to provide equal amplitudes at the respective outputs thereof. The output of amplifier 127 is a sine wave at the fundamental frequency and 0° phase angle and is provided at the output of frequency synthesizer 7 on line 42. The output of amplifier 127 is also shifted in phase by 180° when it passes through phase shifter 129 to provide the sine wave at the fundamental frequency and 180° phase angle at the output of the frequency synthesizer 7 on line 44.

In a similar manner a sine wave at $3F_m$ and 0° phase angle is provided on line 46 and a sine wave at $3F_m$ and 180° is provided on line 48. The signal processing described for amplifier 127 is repeated for the outputs of amplifiers 128, 125, and 126 so that reference signal waves at the fundamental frequency and phase angles of 0°, 90°, 180° and 270° are provided on lines 42, 43, 44 and 45 respectively and reference signal waves at the third harmonic and phase angles of 0°, 90°, 180° and 270° are provided on lines 46, 47, 48 and 49 respectively.

Figure 9:
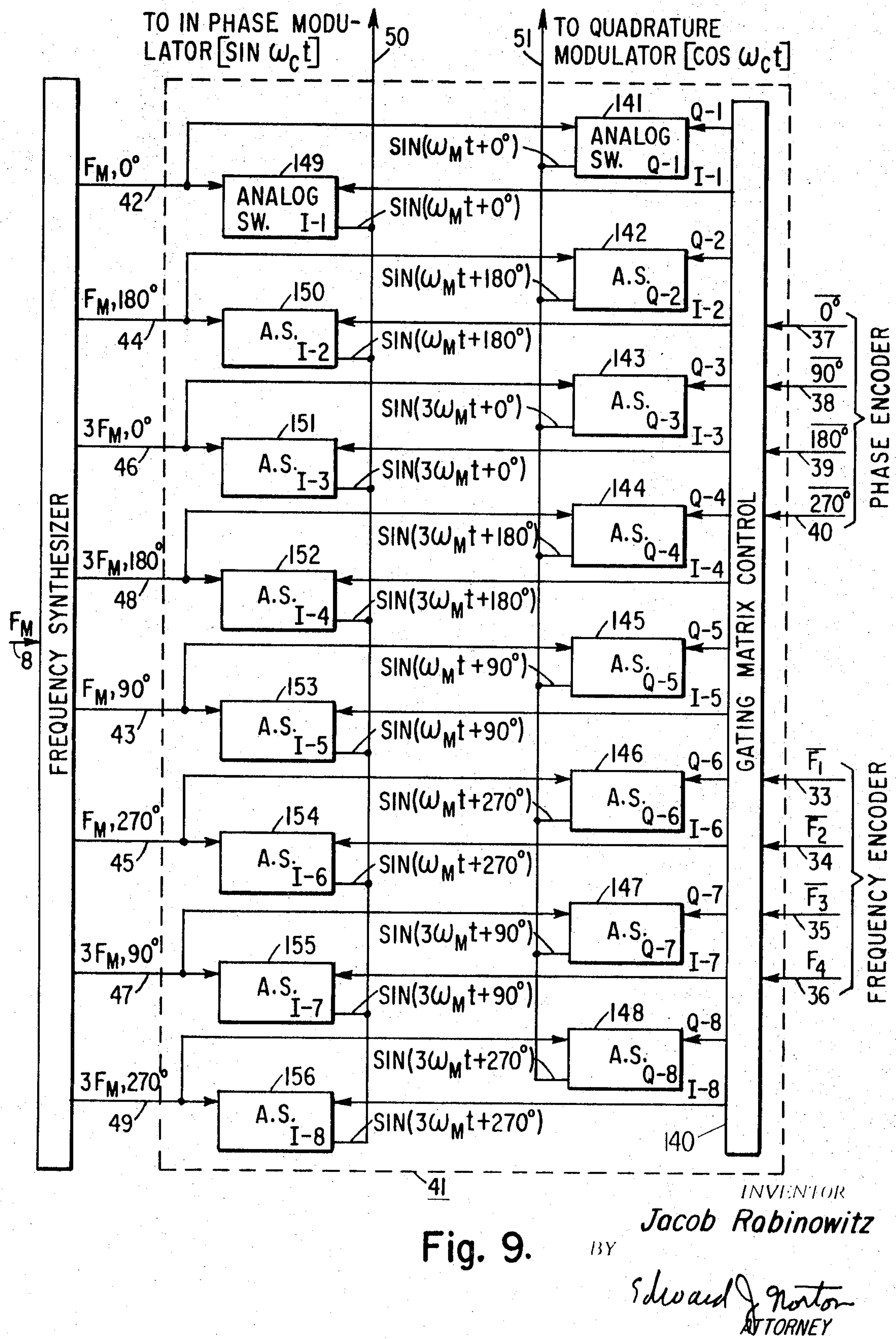
FIG. 9 is a block diagram showing the relationship between the gating matrix control, the frequency synthesizer and the analog switches in the modulator.

The gating matrix 41 is illustrated in Figure 9 to show the manner in which the reference signal waves on lines 42–49 are selected and passed to the frequency translator 52 via lines 50 and 51.

Frequency control pulses generated in the frequency encoder 15 and a differential phase shift control pulse generated in the phase encoder 16 enter a gating matrix control unit 140. The gating matrix control unit 140 responds to the frequency control pulses and the differential phase shift control pulses to provide signal waves to analogue switches 141–156. The signal waves coming from the gating matrix control unit 140 and going to analogue switches 141–156 allow selected ones of the reference signal waves, available at the output of the frequency synthesizer 7, to go to the proper section of the frequency translator 52. Line 50 is designated as the in-phase line and line 51 is designated as the quadrature phase line.

Figures 10, 11:
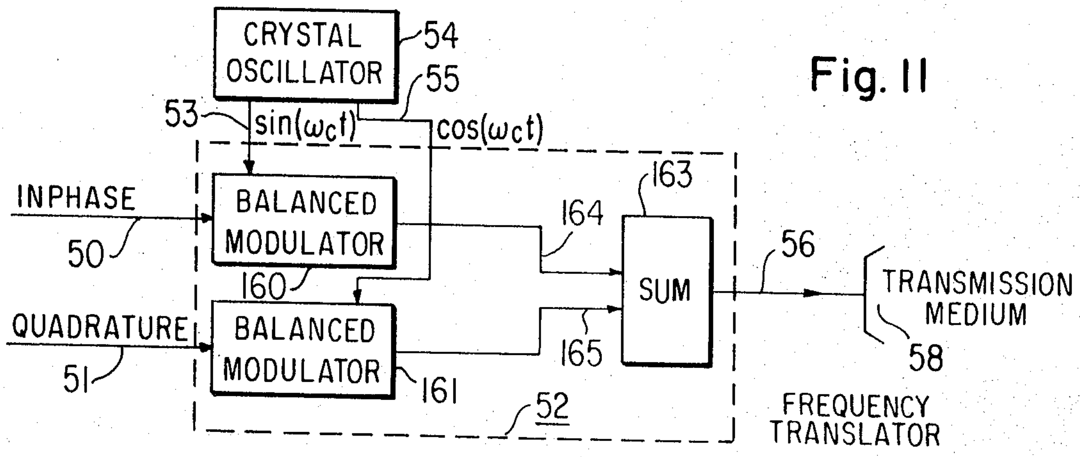
FIG. 10 is a truth table of the modulator gating matrix control.
FIG. 11 is a block diagram of the frequency translator of the modulator.

To illustrate the function of the structure shown in FIG. 9, reference should also be made to the truth table for the gating matrix control unit 140, shown in FIG. 10. The first line of FIG. 10 shows what happens when a differential phase shift control pulse corresponding to 0° appears on line 37 and a frequency control pulse appears in time coincidence on line 33 corresponding to a transmission signal wave of frequency $F_1$. The gating matrix control sends out a pulse to analog switch 155, which is located in the in-phase bank of analog switches 149–156.

When analog switch 155 opens, the reference signal wave at the third harmonic and 90° passes onto the in-phase line 50. At the same time that analog switch 156 opens, analog switch 144 also opens, allowing the reference signal wave at the third harmonic and 180° to pass onto the quadrature phase line 51. Reference to FIG. 3, columns 5 and 6, line 1 shows that the appropriate reference signal waves have been selected by the gating matrix 41 for delivery to the frequency translator 52. The gating matrix 41 similarly responds to the coincidence of other differential phase shift control pulses and frequency control pulses to provide the necessary reference signal waves at the frequency translator 52 in accordance with columns 5 and 6 of FIG. 3.

Referring now to Figure 11, the appropriately selected reference signal waves provided at the frequency translator 52 on the in-phase line 50 go to a balanced modulator 160 where the reference signal wave on line 50 is multiplied by the sine of the carrier frequency which is generated in the crystal oscillator 54 and delivered to balanced modulator 160 via line 52. Similarly, the reference signal wave on the quadrature phase line 51 is multiplied by the cosine of the carrier frequency which is generated in crystal oscillator 54 and delivered to balanced modulator 161 via line 55. The output of balanced modulator 160 is the product of the sine of the carrier frequency times the reference signal wave on the in-phase line 50 and this product is provided at the summing network 163 via line 164. Line 165 delivers the product of the cosine of the carrier frequency times the reference signal wave on the quadrature line 51 to the summing network 163.

The output of summing network 163 is the sum of the sine modulated in-phase reference signal waves from line 164 and the cosine modulated quadrature phase reference signal waves from line 165. The summation which takes place in the summing network 163 completes the generation process of the transmission signal waves shown in FIG. 3. The transmission signal waves thus generated are then transferred out of the summing network on line 56 to a transmission medium 58.

Appropriate structure is provided to receive and decode the transmission signals waves which have been generated. The structure so provided has the capability of correctly framing the transmission signal waves in the time interval comprising a particular sequence. In addition, the structure has the ability to correctly identify any sequence transmitted when only one of the transmission signal waves is received. Furthermore, this structure is able to determine the change in phase between successively transmitted signal waves of the same frequency.

Figure 12:
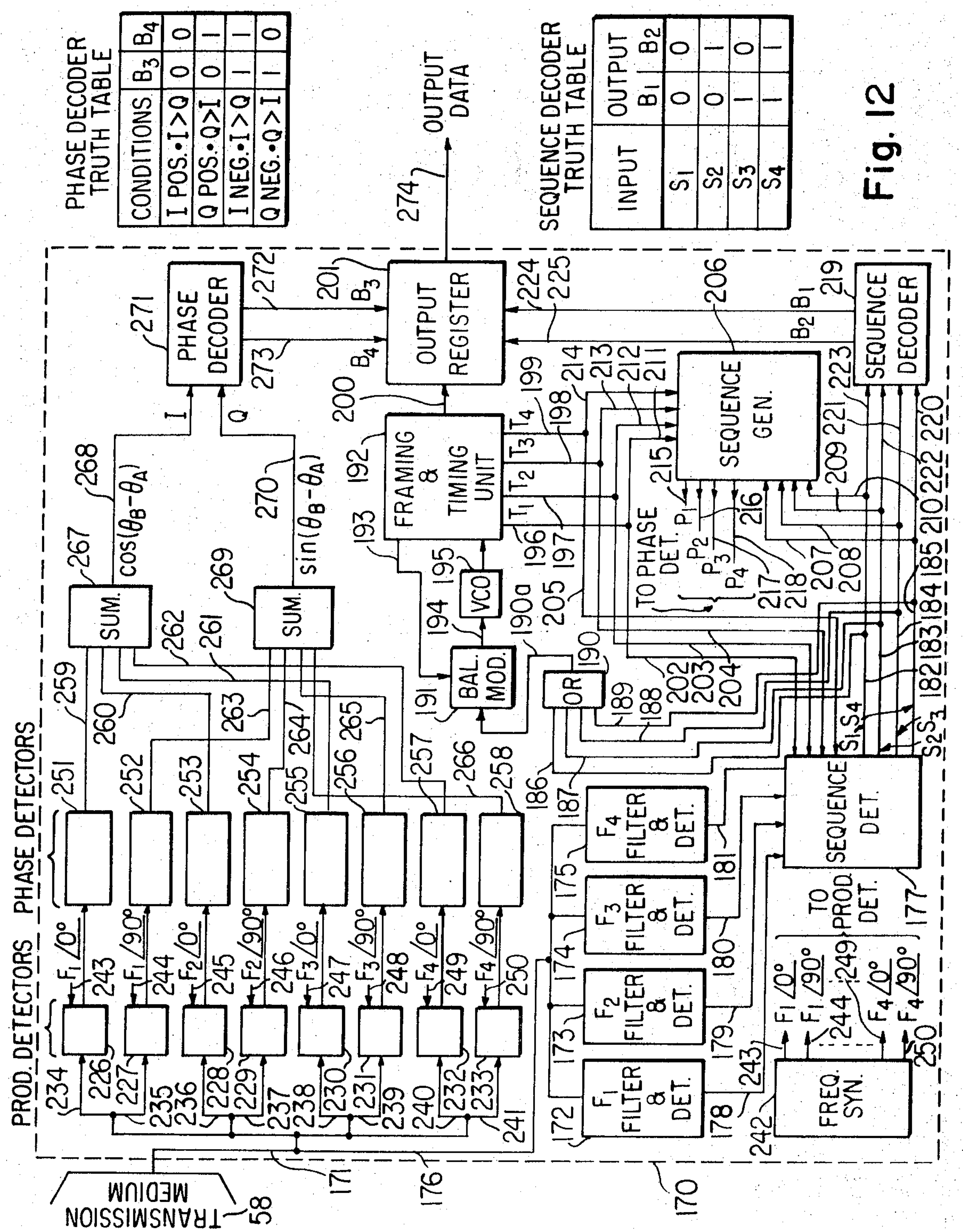
FIG. 12 is a block diagram of the demodulator located at a receiving station.

Referring now to FIG. 12, the transmission signal waves transferred to the transmission medium 58 from the frequency translator 54 arrive at the demodulator 170 via line 171. The transmission signal waves are delivered to a bank of four bandpass filter detectors 172, 173, 174, and 175, via line 176, which pass and detect transmission signal wave frequencies $F_1$, $F_2$, $F_3$, and $F_4$ respectively. A pulse appears at the output of one of the filter-detectors 172–175 each time a transmission signal wave arrives at the demodulator 170.

The pulse outputs of filter-detectors 172–175 are delivered to the sequence detector 177 via lines 178–181 respectively. The sequence detector 177 processes the incoming pulses on lines 178 to 181 to provide a sequence indication pulse on one of the lines 182–185, corresponding to the transmitted sequence of transmission signal waves.

Sequence indication pulse lines 182–185 are connected to lines 186–189 respectively which are coupled to the input of OR-gate 190. OR gate 190 has a sequence indication pulse appearing at its output terminal 190*a* every time a sequence is detected in sequence detector 177. The sequence indication pulses on line 190 are delivered to a balanced modulator 191 which also has an input from the framing and timing unit 192 on line 193. Line 193 carries the framing pulse generated in the framing and timing unit 192. The sequence indication pulses appearing on line 190 shall occupy the same time interval as the framing pulse on line 193.

When the framing pulse on line 193 and the sequence indication pulse on line 190 do not coincide in time an error signal is generated by the balanced modulator 191 on line 194. The error signal on line 194 is used to bias a voltage controlled oscillator 195. The output of the voltage controlled oscillator 195 is delivered to the framing and timing unit 192 to adjust the frequency of the framing pulse to match the frequency of the sequence indication pulse appearing on line 190.

Framing and timing unit 192 provides all the timing signals required at the demodulator 170. Timing interval pulses corresponding to time intervals $T_1$, $T_2$, $T_3$ and $T_4$ are derived from the framing pulse and are provided at terminals 196, 197, 198 and 199 respectively at the output of the framing and timing unit 192. A timing signal is also provided on line 200 for use in output register 201.

Timing interval pulses $T_1$, $T_2$, $T_3$ and $T_4$ generated in the framing and timing unit 192 are provided at the sequence detector 177 on lines 202, 203, 204 and 205 respectively. The timing interval pulses arriving at the sequence detector 177 on lines 202–205 are used in conjunction with the detected transmission signal wave pulses on lines 178–181 at the sequence detector 177 to generate the sequence indication pulses on lines 182–185.

The sequence indication pulses on lines 182–185 are delivered to a sequence generator 206 on lines 207–210 respectively and the timing interval pulses on lines 196–199 are delivered to the sequence generator 206 on lines 211–214 respectively. Sequence generator 206 combines the single pulse on one of the lines 207–210, which indicates the sequence received, with the timing interval pulses coming in one lines 211–214 to generate four pulses, $P_1$, $P_2$, $P_3$, and $P_4$ respectively provided on lines 215–218. Pulses $P_1$, $P_2$, $P_3$, and $P_4$ on lines 215–218 are arranged in time to correspond to the frequency control pulses associated with the particular sequence received at the demodulator 170.

The sequence indication pulses on lines 182–185, one for each sequence received, are also provided at the sequence decoder 219 on lines 220–223. Sequence decoder 219 performs the function displayed in the associated truth table shown in Figure 12. When a sequence indication pulse $S_1$ appears on line 220 the output of the sequence decoder 219 is a "0" binary level on line 224 corresponding to bit one and a "0" binary level on line 225 corresponding to bit two. Similarly, sequence indication pulses $S_2$, $S_3$, and $S_4$ will cause the sequence decoder 219 to put out binary levels on lines 224 and 225 corresponding to the levels shown in the associated truth table in FIG. 12. The pulses generated on lines 224 and 225 are provided at the output data register 201.

Still referring to Figure 12, the incoming transmission signal waves on line 171 are also coupled to eight product detectors 226–233 via lines 234–241. Product detectors 226–233 also are provided with input signals from frequency synthesizer 242 which puts out an in-phase or 0° reference signal and a quadrature phase or 90° reference signal at each of the transmission signal wave frequencies $F_1$, $F_2$, $F_3$, and $F_4$. The reference signal waves generated in frequency synthesizer 242 are delivered to the product detectors 226–233 on lines 243–250. Product detectors 226, 228, 230, and 232 are designated as in-phase product detectors because each has an input from the frequency synthesizer 242 which carries one of the reference signal waves at a phase angle of 0°. Similarly, product detectors 227, 229, 231, and 233 are designated as quadrature phase product detectors because each has an input from frequency synthesizer 242 which carries one of the reference signal waves at a phase angle of 90°.

Each one of the product detectors 226–233 is coupled to one of the phase detectors 251–258. Phase detectors 251, 253, 255, and 257 having inputs from the in-phase product detectors 226, 228, 230 and 232, each provide an output signal on lines 259–262 respectively which represents the cosine of the difference in phase between transmission signal waves of the same frequency in successively received sequences. Each of the phase detectors 252, 254, 256 and 258, being coupled to the quadrature product detectors 227, 229, 231 and 233, provides an output signal on lines 263–266 respectively which represents the sine of the difference in phase between transmission signal waves of the same frequency in successively received sequences. The signals representing the cosine of the difference in phase between successive transmission signal waves of the same frequency carried on lines 259–262 are added in the summing network 267 and the signal wave resulting from the summing process is transferred to line 268. The signals representing the sine of the difference in phase between successive transmission signal waves of the same frequency, carried on lines 263–266 are added in summing network 269 and transferred to line 270.

The signals on lines 269 and 270 are coupled to the phase decoder 271. Phase decoder 271 has outputs on lines 272 and 273 which provide binary levels corresponding to the decoded difference in phase between successive transmission signal waves, these outputs being coupled to the output register 201. Line 272 carries the binary level corresponding to bit three and line 273 carries the binary level corresponding to bit four.

The binary levels corresponding to bits one, two, three and four are transferred to the output register 201 in parallel from lines 224, 225, 272 and 273 respectively and serially shifted out of register 201 on line 274 to provide the exact reproduction of the input signal originally coming from the input data source 57.

Figure 13:
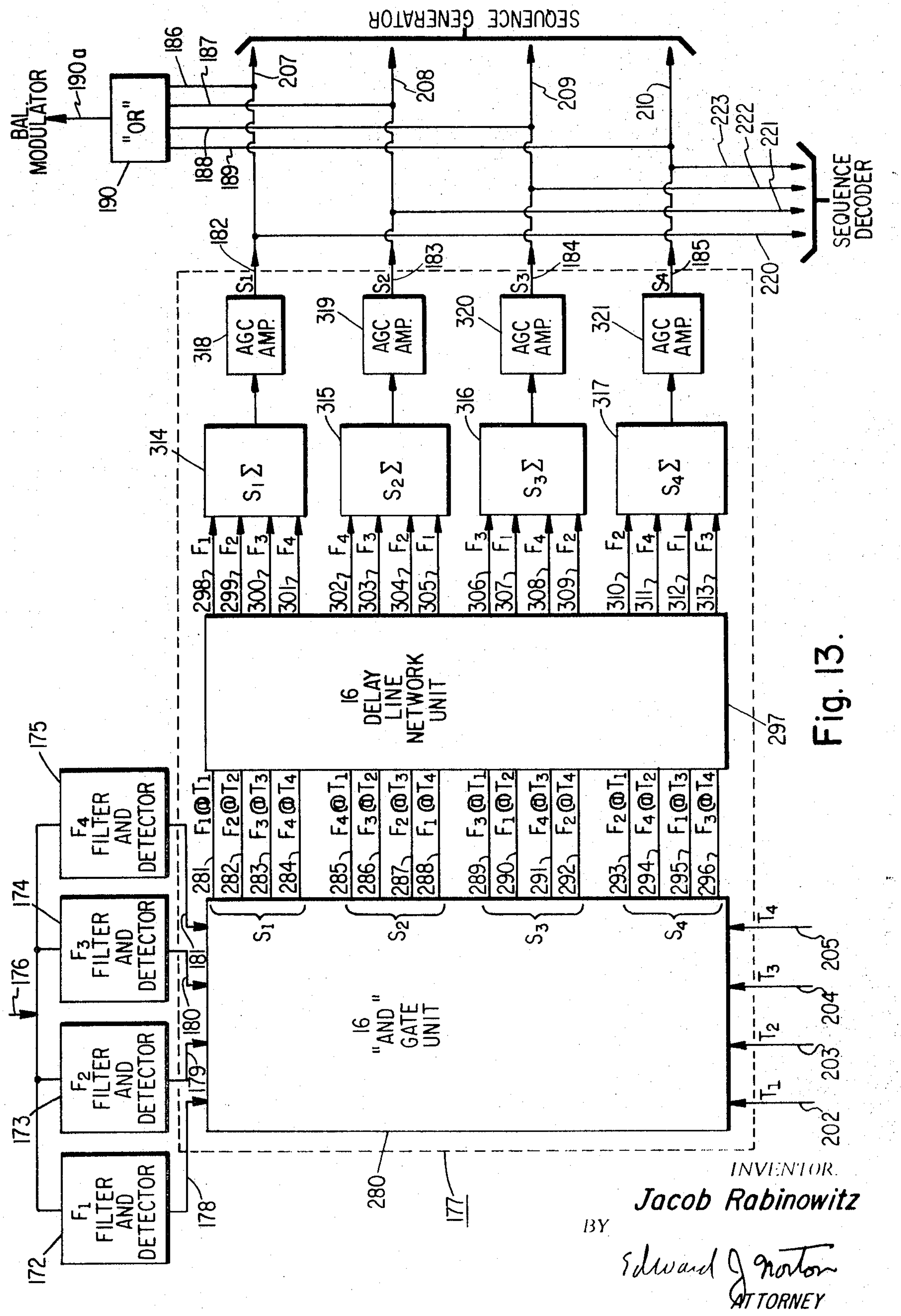
FIG. 13 is a block diagram showing the sequence detector of the demodulator.

Figure 13 shows the manner in which sequence detection is accomplished in the sequence detector 177 even though only one of the four transmission signal waves in a given sequence is received at the demodulator 170. Under favorable transmission conditions, all the transmission signal waves of a sequence will be received at the demodulator 170. As each transmission signal wave is received, a pulse is generated at the output of one of the four frequency detector units 172–175 corresponding to the frequency of the transmission signal wave received.

Each of the four output lines 178–181 of the corresponding filter detectors 172–175 is connected to one side of each of four "AND" gates located in the 16 "AND" gate unit 280. The other side of each of the four "AND" gates, four for each one of the four frequencies of the transmission signal waves, is connected to one of the timing interval pulse lines 202–205. One of the output lines 281–296 of the 16 AND-gate unit 280 has a pulse on it when one of the received transmission signal waves, filtered and detected on one of the lines 178–181, is coincident at one of the 16 AND gates with a timing interval pulse.

For example, when sequence $S_1$ is received at the demodulator 170 the $F_1$ filter-detector 172 generates a pulse which is in time coincidence with the timing interval pulse $T_1$ on line 202. The "AND" gate with which line 178 and line 202 are associated generates a pulse on line 281 corresponding to $F_1$ at time $T_1$. The $F_2$ filter-detector 173 puts out the next detected pulse for the $S_1$ sequence on line 179. The pulse on line 179 combines with the timing interval pulse $T_2$ on line 203 at the appropriate "AND" gate and provides a pulse on line 282 corresponding to $F_2$ at time $T_2$. This process is repeated for the outputs of the $F_3$ filter detector 180 and the $F_4$ filter detector 181 and the timing interval pulses $T_3$ on line 204 and $T_4$ on line 205 to provide a pulse on line 283 corresponding to $F_3$ and time $T_3$ and a pulse on line 284 corresponding to $F_4$ at time $T_4$.

The outputs 281 –296 from the 16 AND-gate unit 280 are transferred to the 16 delay line network unit 197. Delay line network unit 297 takes all of the pulses corresponding to transmission signal waves arranged in their sequence of occurrence from the "AND" gate unit 280 and delays all of the pulses on lines 281–296 the appropriate amount so that they all appear at the delay line network output terminals 298–313 at time $T_4$.

The four pulses appearing on four of the lines 298 –313 are added in one of the summing networks 314–317, depending upon the sequence received. The summing networks are each coupled to one of the amplifiers 318–321. Each one of the amplifiers 318–321 has an automatic gain control. The sequence indication pulse is transferred out of the sequence detector 177 on one of the lines 182–185.

For example, assume in FIG. 13 that sequence $S_1$ was transmitted and the only transmission signal wave received is $F_3$. FIG. 1 shows that the transmission signal wave at frequency $F_3$ is transmitted during the relative time interval $T_3$. Therefore, the output of the $F_3$ filter detector 174 on line 180 will coincide with the locally generated timing interval pulse $T_3$ on line 204 and the "AND" gate in the 16 "AND"-gate unit 280, to which line 180 and line 204 are both connected, will provide a pulse on line 283 corresponding to $F_3$ at time interval $T_3$. The pulse on line 283 is the only output from the 16 "AND"-gate unit 280 since there was but one transmission signal wave at frequency $F_3$ received and only one time coincidence with the timing interval pulse on line 204. The pulse on line 283 is delayed in the 16 delay line network unit 297 by one time interval and therefore appears on line 300 at time interval $T_4$. The pulse on line 300 passes through summing network 314 and is amplified by amplifier 318 whose gain has been automatically adjusted such that the amplitude of the pulse appearing at the output of amplifier 318 is at a predetermined level. This automatic gain controlled amplification process provides sequence indication pulses on lines 182–185 of uniform amplitude regardless of the number of transmission signal waves received in any incoming sequence of transmission signal waves.

Figure 14A:
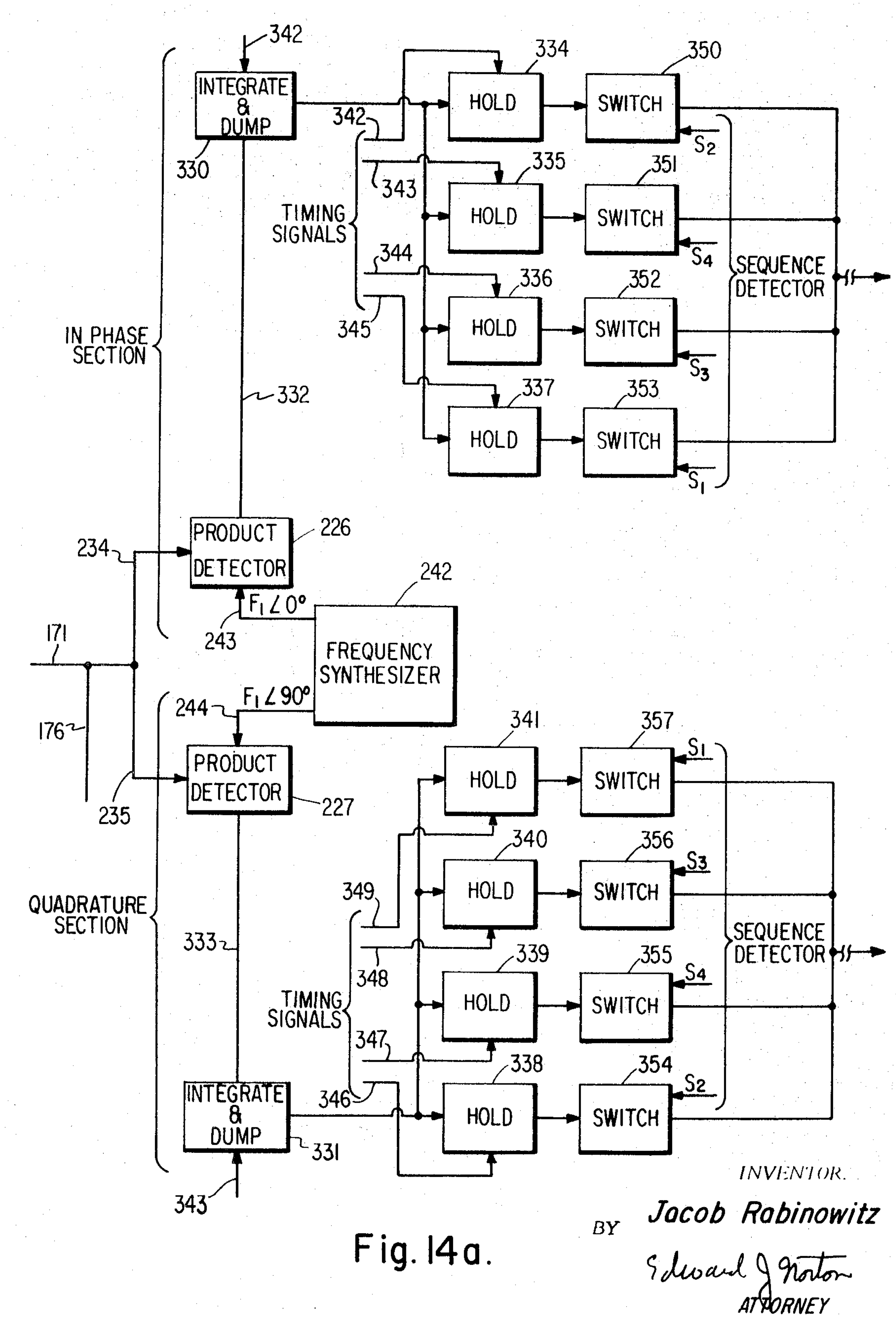
Figure 14B:
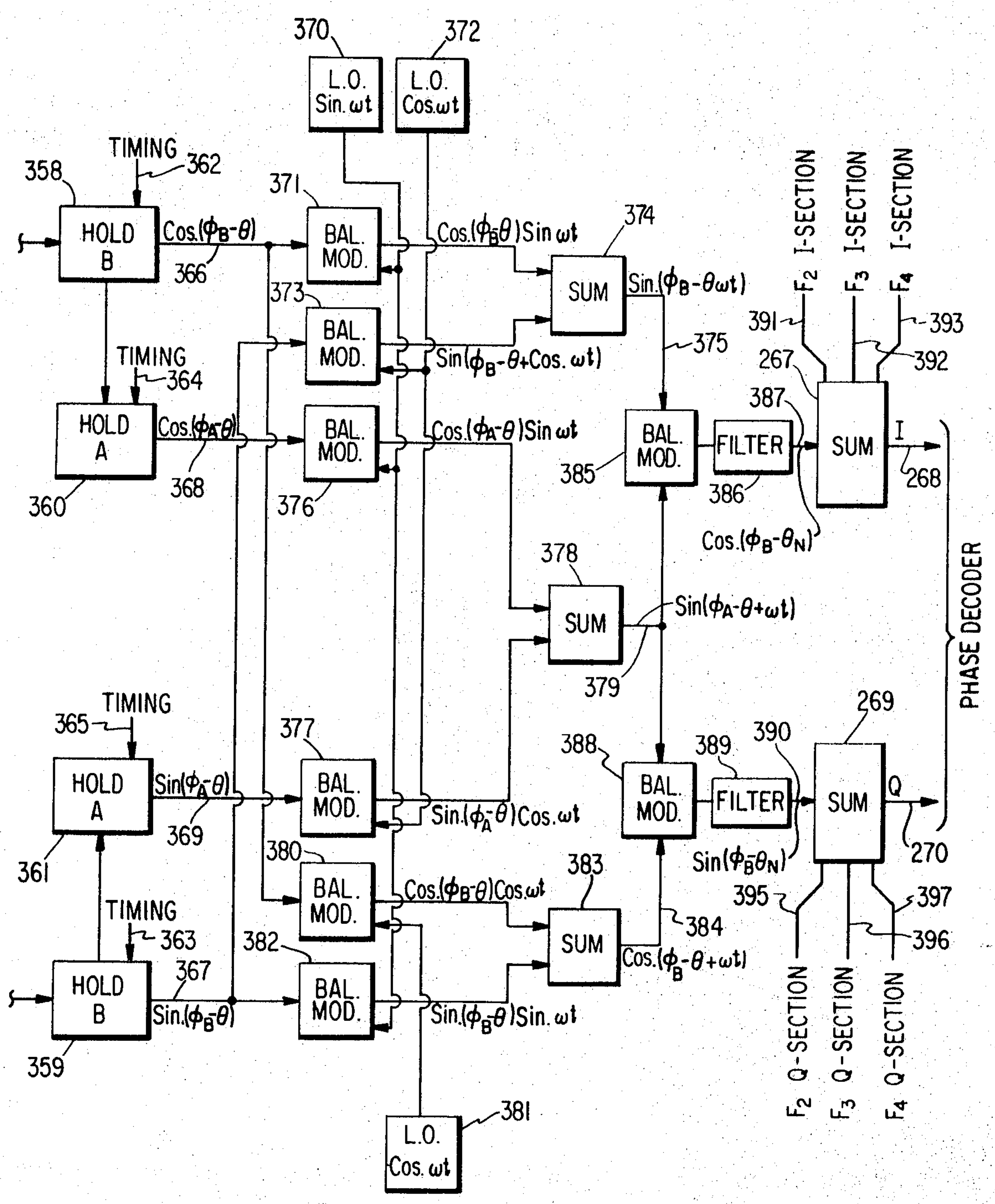

In composite FIG. 14, comprising FIGS. 14a and 14b, the manner of detecting the difference in phase between successively received transmission signal waves at the frequency $F_1$ is shown. Transmission signal waves at frequencies $F_2$, $F_3$ and $F_4$ are treated in an identical manner.

When the incoming transmission signal wave on line 171 is at the frequency $F_1$, the outputs from product detectors 226 and 227 will be a DC level. If the incoming transmission signal wave on line 171 is at a frequency other than $F_1$, then the outputs from product detectors 226 and 227 will be a signal at a frequency equal to the difference between $F_1$ and the incoming signal frequency, that is, a beat frequency signal.

The outputs from product detectors 226 and 227 are coupled respectively to integrate and dump circuits 330 and 331 via lines 332 and 333. Integration is performed in each bit time interval and the results are cleared and dumped into successive hold circuits 334–341. Timing signals for the integrate and dump circuits 330 and 331 are provided from the framing and timing unit 192 on lines 342 and 343. The frequency spacings of the transmission signal waves are preselected to be orthogonal and therefore the integration of the unwanted signals $F_2$, $F_3$, $F_4$ in the integrate and dump circuits 330 and 331 over one bit time interval is zero. Integration of the resulting DC level when the incoming transmission signal wave is at the frequency $F_1$ results in a positive, negative or zero DC level and an amplitude proportional to cosine $(\Phi - \theta)$ in integrate and dump circuit 330 and is proportional to sine $(\Phi - \theta)$ in the output of integrate and dump circuit 331, where is the phase of the incoming transmission signal wave at frequency $F_1$ and $\theta$ is the arbitrary relative phase of the signal in the frequency synthesizer 242 which is used to generate the reference signal waves on lines 243 and 244.

The hold circuits 334–341 have timing signals applied on lines 342–349 from the framing and timing unit 192 to sequentially hold the output signals of the integrate and dump circuits 330 and 331. For example, if the sequence $S_1$ is received, the first integration results in a DC level and the output of integrate and dump circuit 330, in the first bit time interval, is stored in hold circuit 337. In the next three bit time intervals hold circuits 336, 335 and 334 are successively opened and only integrated received noise is caused to be held in each as a result of integrating orthogonal signals. The same process occurs at the output of integrate and dump circuit 331 and hold circuit 341 contains a DC level while hold circuits 340, 339 and 338 successively receive integrated noise.

Only those hold circuits (337 and 341 in the example given) containing DC levels are allowed to pass their information through the switches 350–357. FIG. 1 shows the relative location of the transmission signal wave at a frequency $F_1$ for all of the permissible sequences $S_1$, $S_2$, $S_3$ and $S_4$. When $S_1$ is received at demodulator 170 only hold circuits 337 and 341 in FIG. 14 contain DC levels. Therefore a sequence indication pulse from sequence detector 177 corresponding to sequence S1 is applied to switches 353 and 357 to pass the DC levels. Similarly, when sequence S2 is received only hold circuits 334 and 338 contain DC levels and a sequence indication pulse corresponding to S2 from sequence detector 177 passes the DC levels through switches 350 and 354. The DC level proportional to Cos $(\Phi - \theta)$ which is passed through the selected one of switches 350–353 and the DC level proportional to sin $(\Phi - \theta)$ which is passed through the selected one of switches 354–357 go to hold B circuits 358 and 359 respectively. Similar phase related information is stored in hold A circuits 360 and 361 from the previously received sequence of transmission signal waves. Timing signals from the framing and timing unit 192 are applied to hold B circuits 358 and 359 on lines 362 and 363 respectively and to hold A circuits 360 and 361 on lines 364 and 365.

The output of hold B circuit 358 on line 355 is proportional to cos $(\Phi_B - \theta)$ and the output of hold B circuit 359 on line 367 is proportional to sin $(\Phi_B - \theta)$, where the subscript B refers to the presently received sequence of transmission signal waves. Hold A circuit 360 has an output on line 368 proportional to cos $(\Phi_A - \theta)$ and hold A circuit 361 has an output on line 369 proportional to sin $(\Phi_A - \theta)$, where the subscript A refers to the previously received sequence of transmission signal waves.

Again in FIG. 14, the signal proportional to cosine $(\Phi_B - \theta)$ on line 366 modulates the signal sin $(\omega t)$ from local oscillator 370, in balanced modulator 371. The signal on line 367 proportional to sin $(\Phi_B - \theta)$ modulates the cos $(\omega t)$ from local oscillator 372, in balanced modulator 373. Outputs from the balanced modulators 371 and 373 are added in the summing network 374 to provide an output signal on line 375 which is sin $(\Phi_B - \theta + \omega t)$. The modulating and summing process described performs the trigonometric identity sin (A+B)=sin A cos B+cos A sin B. The very same process of modulation and summing is performed with respect to balanced modulator 376 and local oscillator 370 in conjunction with balanced modulator 377 and local oscillator 372, wherein the outputs of balanced modulators 376 and 377 are added in summing network 378 to provide a signal corresponding to sin $(\Phi_A - \theta + \omega t)$ on line 379.

The output signals of balanced modulator 380 working with local oscillator 381 and balanced modulator 382 working with local oscillator 370 are added in summing network 383 to provide a signal corresponding to $-\cos(\Phi_B - \theta + \omega t)$ on line 384. Summing network 383 performs the trigonometric identity cos (A+B) =cos A cos B–sin A sin B. Therefore; –cos (A+B)=sin A sin B–cos A Cos B.

The signals on lines 375 and 379 are modulated in balanced modulator 385, the double-frequency component is filtered out in filter 386 and the resulting signal corresponding to cos $(\Phi_B - \Phi_A)$ is transferred to line 387.

The signals on line 379 and 384 are modulated in balanced modulator 388 and the double-frequency component is filtered out by filter 389 and the resulting signal corresponding to sin $(\Phi_B - \Phi_A)$ is transferred to line 390.

The signal on line 387 which represents the cosine of the difference in phase between two successive transmissions of the transmission signal waves at frequency F1 is added to similar cosine functions for the other frequencies F2, F3, and F4, coming in on lines 391, 392 and 393, in the summing network 267. The sum of the input signals to summing network 267 is transferred to line 268. Similarly the signals representing the sine of the difference between successive transmission signal waves of the same frequency on lines 395, 396, 397 and the signal on line 390 are added in summing network 269 and the sum is transferred to line 270.

The output signal cos $(\Phi_B - \Phi_A)$ on line 268 is called the in-phase component while the signal sin $(\Phi_B - \Phi_A)$, on line 270, is called the quadrature phase component.

Since the phase differences $(\Phi_B - \Phi_A)$, between successive transmission signal waves are selected to be 0° 90°, 180°, or 270°, the outputs of summing networks 267 and 269 will be positive, negative or zero. When one of the two outputs from summing networks 267 and 269 is positive or negative the other one will be zero.

Referring to FIG. 15, the phase decoder checks the signals on lines 268 and 270 to determine the sign of the two signals and which of the two signals has the greater absolute value. When the relative magnitudes and signs of the signals on lines 268 and 270 are determined, the phase decoder 271 generates pulses corresponding to binary digits on lines 272 and 273.

When the phase difference $(\Phi_B - \Phi_A)$ is 0°, the cosine function on line 268 goes positive and the sine function on line 270 goes to zero. Slicer 400 tests for positive values of signals coupled thereto from line 268 and therefore has a positive output on line 401. Slicer 402 tests for positive values of signals coupled thereto from line 270 and therefore has a negative going output on line 403. Square law detector 404 checks the absolute value of the signal on line 268 and therefore has a high output, whereas square law detector 405 checks the absolute value of the signal on line 270 and has a near-zero output.

The comparator 406 is coupled to the output terminals of square law detectors 404 and 405 and determines whether the absolute value of the signal on line 268 is greater than the absolute value of the signal on line 270. For the example given, comparator 406 has a positive output. Inverter 407 is coupled to the output terminal of slicer 400 via line 401 and inverts the positive signal on line 401 to a negative signal on line 408. Line 408 is coupled to one input of NAND-gate 409 and line 410 couples the output signal from comparator 406 to a second input terminal of NAND-gate 409. With a low level signal on line 408 and a high level signal on line 410, NAND-gate 409 generates a positive going pulse at the output thereof on line 411.

In addition to the input to NAND-gate 409 on line 410, the output signal from comparator 406 is coupled to an inverter 412. Inverter 412, for the example given, inverts the positive output pulse to a negative pulse. The output signal from inverter 412 is coupled to one input of NAND-gate 413 via line 414. The second input to NAND-gate 413 is coupled from the output of slicer 402 via line 415. The output of slicer 402, in the example given, is a negative pulse and the output of inverter 412 is a negative pulse, therefore NAND-gate 413 generates a positive pulse at its output terminal which is coupled to line 416.

The output signal from inverter 412 is also coupled to one input of NAND-gate 419 via line 420. The second input to NAND-gate 419 is the output signal from slicer 402 inverted by inverter 417 and provided at NAND-gate 419 via line 418. With the inverted output signal of slicer 402 at a positive level on line 418 and the inverted output signal from comparator 406 at a negative level on line 420, NAND-gate 419 generates a positive going pulse at the output thereof and couples the positive going output pulse to line 421.

NAND-gate 423 has an input signal coupled from NAND-gate 409 via line 411. A second input signal is coupled to NAND-gate 423 from NAND-gate 419 via line 421. In the example given lines 421 and 411 couple positive going signals and therefore NAND-gate 423 generates a negative going pulse on line 272, corresponding to Bit 3.

NAND-gate 422 has an input signal coupled from NAND-gate 409 via line 411. NAND-gate 422 also has an input signal coupled from NAND-gate 413 via line 416. The positive signals on lines 411 and 416 causes the output signal of NAND-gate 422 to go negative on line 273, corresponding to Bit 4.

The logic system following lines 272 and 273 is in the positive sense. That is, high levels correspond to the binary "1" state and low levels correspond to the binary "0" state. Therefore, in the example given, a binary "0" is generated on line 272 corresponding to bit three and a binary "0" is generated on line 273 corresponding to bit four which is exactly the differential phase shift information component of the input signal when a 0° phase change is desired. Positive logic is used here to make the output bits three and four on lines 272 and 273 compatible with the input data source 57.

Phase decoder 271 operates in a similar fashion to that previously described to put out "0" and "1", "1" and "1", and "1" and "0" on lines 272 and 273 respectively for phase differences of 90° 180° and 270°. The output from lines 272 and 273 of phase decoder 271 is exactly the binary digits corresponding to the differential phase shift information component of the input signals shown in FIG. 2.

In FIG. 16, the two data bits B1 and B2 on lines 224 and 225 were derived from detecting the incoming sequence of transmission signal waves and processing that sequence in the sequence decoder 219. The two data bits B3 and B4 on lines 272 and 273 were derived from the signal processing in the phase decoder 271. The four bits on lines 224, 225, 272 and 273 are read into the four stage output shift register 201 in parallel and then serially transferred out to line 274. The timing signal on line 200 is generated in the framing and timing unit 192.

The bandwidth of a typical system employing the invention described above may be in the range of 5–10 MHz. The transmission signal waves in such a system may be centered around a 70 MHz carried frequency. When the frequency synthesizer uses a square wave signal at a frequency of 576 kHz. to derive the reference signal waves, the frequencies F1, F2, F3 and F4 will be respectively 68.272 MHz, 69.424 MHz, 70.576 MHz and 71.728 MHz.

As herein described, typical values for the phase changes of transmission signal waves of the same frequency between successively transmitted sequences are 0°, 90°, 180° and 270°.

A typical system employing the invention may handle data rates from 0.576 MHz to 2.304 MHz. The invention is particularly useful in systems designed for troposcatter radio communications, where problems due to signal fading and multipath distortion are prevalent. However, the application of the invention is not limited to troposcatter communications but is equally useful in any communications system subject to signal fading and multipath distortion.

I claim:

1. In communication system which transmits a given one of a plurality of words in response to an input signal having a sequence information component and a differential phase shift information component, the arrangement comprising:

controllable wave-producing means responsive to said information components for selectively providing a plurality of transmission signal waves at an output terminal thereof, said signal waves being provided at said output terminal in a predetermined sequence corresponding to said sequence information component, said controllable wave-producing means including means for arranging said predetermined sequence such that the location of a given one of said transmission signal waves within said predetermined sequence uniquely defining said sequence, said controllable wave-producing means including means for providing the signal waves in each sequence with a specified phase shift, with respect to the signal waves of corresponding frequency in a previous sequence, said phase shift provided being dependent upon said phase shift information component, the relative phase shifts and sequence of occurrence of the signal waves provided at said output terminal in response to said input signal being representative of said given one of said plurality of words, the signal waves corresponding to a given word having mutually different frequencies.

2. The arrangement according to claim 1, further comprising an input signal means connected to said controllable wave-producing means for providing an input signal comprising a plurality of pulses, each pulse corresponding to a binary digit, and wherein said sequence information component comprises selected ones of said plurality of binary digits and said differential phase shift information component comprises other selected ones of said plurality of binary digits.

3. The arrangement according to claim 1 further comprising an input signal means, connected to said controllable wave producing means, for providing an input signal corresponding to a series of four binary digits and wherein said sequence information component corresponds to two of said binary digits and said differential phase shift information component corresponds to the other two binary digits, there being four predetermined sequences of said signal waves, each one of four predetermined sequences comprising four signal waves.

4. The arrangement according to claim 1, wherein said controllable wave-producing means includes at least one modulator for modulating said transmission signal waves provided at said output terminal.

5. In a communication system which transmits a given one of a plurality of words in response to an input signal having a sequence information component and a differential phase shift information component, the combination comprising:

first, pulse-generating means responsive to said sequence information component for producing a given number of frequency control pulses arranged in one of a fixed number of predetermined sequences such that the location of one frequency control pulse in a sequence uniquely defines the sequence, said pulse-generating means including means for arranging said frequency control pulses in said predetermined sequences;

second, pulse generating means responsive to said differential phase shift information component for producing at least one phase control pulse;

signal-generating means for generating a plurality of transmission signal waves each corresponding to a mutually different frequency;

means for translating said transmission signal waves to a transmission medium; and gating means responsive to said frequency control pulses and to said at least one phase control pulse for sequentially selectively transferring said transmission signal waves to said translating means in an order corresponding to said predetermined sequence, each of said transmission signal waves being translated at a time coinciding with the occurrence of a corresponding one of said frequency control pulses, each of said transmission signal waves having a specified phase with respect to a reference phase, said specified phase being dependent upon said phase control pulse, the location of one of said transmission signal waves within said predetermined sequence uniquely defining said sequence, the location of said one transmission signal wave within said predetermined sequence and the phase shift of said one transmission signal wave relative to said reference phase uniquely defining said given word.

6. The combination according to claim 5, further comprising an input signal means connected to said first and second pulse generating means for providing said input signal which comprises a plurality of pulses, each pulse corresponding to a binary digit, and wherein said sequence information component comprises selected ones of said plurality of binary digits and said differential phase shift information component comprises other selected ones of said plurality of binary digits.

7. The combination according to claim 5 further comprising an input signal means connected to said first and second pulse generating means for providing said input signal which corresponds to a series of four binary digits and wherein said sequence information component corresponds to two of said binary digits and said differential phase shift information component corresponds to the other two binary digits, there being four predetermined sequences of said signal waves, each one of said four predetermined sequences comprising four signal waves.

8. The combination according to claim 5, wherein said first pulse generating means comprises:

timing interval pulse generator means for generating a plurality of timing pulses occurring at times corresponding to the occurrence of said transmission signal waves;

sequence encoding means responsive to said sequence information component for generating a given one of a plurality of sequence indication pulses; and gating means responsive to said sequence indication pulse and to said plurality of timing pulses for producing said frequency control pulses arranged in one of a fixed number of predetermined sequences, and occurring at times corresponding to the occurrence of said timing pulses.

9. The combination according to claim 5, wherein said signal generating means includes:

frequency synthesizing means for generating a plurality of reference signal waves, at least two of said reference signal waves having different frequencies; and a plurality of phase shifters coupled to said frequency synthesizing means for providing said plurality of transmission signal waves comprising said at least two reference signal waves at a plurality of specified phase shifts.

10. The combination according to claim 5, wherein said translating means includes at least one modulator for modulating said transmission signal waves prior to the transfer of said transmission signal waves to said transmission medium.

11. The combination according to claim 5, wherein said gating means comprises:

a plurality of transfer switches for selectively transferring said transmission signal waves to said translating means; and gating matrix means responsive to said frequency control pulses and to said at least one phase control pulse for selectively providing a plurality of switch control pulses to said plurality of transfer switches, each of said switch control pulses being provided at times corresponding to the occurrence of each of said frequency control pulses.

12. In a communication system which transmits a given one of a plurality of words in response to an input signal having a sequence information component and a differential phase shift information component, each of said transmitted words comprising a plurality of transmission signal waves, the combination comprising:

timing interval pulse generator means for generating a plurality of timing pulses occurring at times corresponding to the occurrence of said transmission signal waves;

sequence encoding means responsive to said sequence information component for generating one of a plurality of sequence indication pulses;

first gating means responsive to said one sequence indication pulse and to said plurality of timing pulses for producing a given number of frequency control pulses arranged in one of a fixed number of predetermined sequences corresponding to said sequence information component;

pulse-generating means responsive to said differential phase shift information component for producing at least one phase control pulse;

frequency synthesizing means for generating a plurality of reference signal waves, at least two of said reference signal waves having different frequencies;

a plurality of phase shifters coupled to said frequency synthesizing means for providing, at corresponding output terminals thereof, said at least two references signal waves at a plurality of relative phases;

signal-translating means responsive to at least one processed reference signal wave for providing transmission signal waves and for coupling said transmission signal waves to a transmission medium; and second gating means responsive to said frequency control pulses and to said at least one phase control pulse for selectively coupling said phase shifter output terminals to an input terminal of said translating means, said second gating means being operative to provide said at least one processed reference signal wave at said input terminal at a time corresponding to the occurrence of each of said frequency control pulses, said frequency synthesizing means, said phase shifter and said signal-translating means being operatively interconnected so that the transmission signal waves coupled to said transmission medium are arranged in sequences of mutually different carrier frequencies corresponding to said frequency control pulses, and so that the transmission signal waves of each sequence have a specified phase shift with respect to the signal waves of corresponding frequency in the previously transmitted sequence, said specified phase shift dependent upon said phase control pulse, said first gating means being arranged so that the location of one of said transmission signal waves within said predetermined sequence uniquely defines said sequence, the location of one of said transmission signal waves within said predetermined sequence and the phase shift of said transmission signal wave with respect to the phase of a transmission signal wave of corresponding frequency in the previously transmitted sequence uniquely defining said given word.

13. The combination according to claim 12, further comprising input signal means for providing said input signal which comprises a plurality of pulses, each pulse corresponding to a binary digit, and wherein said sequence information component comprises selected ones of said plurality of binary digits and said differential phase shift information component comprises other selected ones of said plurality of binary digits.

14. The combination according to claim 12, further comprising input signal means for providing said input signal which corresponds to a series of four binary digits and wherein said sequence information component corresponds to two of said binary digits and said differential phase shift information component corresponds to the other two binary digits, there being four predetermined sequences of said transmission signal waves each one of said four predetermined sequences comprising four transmission signal waves of different frequencies.

15. The combination according to claim 14, wherein said translating means comprises:

first modulator means for modulating a selected one of said processed reference signal waves according to the cosine of the modulating frequency;

second modulator means for modulating another selected one of said processed reference signal waves according to the sine of the modulating frequency; and signal combiner means for combining said selected processed reference signal wave modulated by the cosine of the modulating frequency with said other selected processed reference signal wave modulated by the sine of the modulating frequency.

16. The combination according to claim 12, wherein said frequency synthesizer means provides two reference signal waves, one of said reference signal waves having a fundamental frequency and the other of said reference signal waves having a frequency corresponding to the third harmonic of said fundamental frequency, and wherein said plurality of phase shifters provides four processed signal waves at said fundamental frequency and phase angles of 0°, 90°, 180°, and 270° and further provides four processed signal waves at said third harmonic frequency and phase angles of 0°, 90°, 180°and 270°.

17. In a communication system adapted to receive a plurality of words, each word comprising a plurality of input signals of mutually different frequencies, said signals being arranged in one of a predetermined number of sequences, said signals being characterized by differential phase shift thereof between successive words, the combination comprising:

sequence detection means responsive to at least one of said input signals and the location of said input signal in said received word for generating a sequence information component signal uniquely defining said one of a number of predetermined sequences;

phase detection means for generating a phase information component signal corresponding to the difference in phase of said at least one input signal with respect to an input signal of corresponding frequency in a previous word; and signal combining means for combining said sequence information component signal and said phase information component signal to provide an output information signal uniquely corresponding to said received word.

18. The combination according to claim 17, wherein said sequence detection means includes means for generating said generated sequence information component signal which comprises a plurality of pulses, each pulse corresponding to a binary digit and wherein said phase detection means includes means for generating said phase information component signal which comprises a plurality of pulses, each pulse corresponding to a binary digit.

19. In a communications system adapted to receive a plurality of words, each word comprising a plurality of input signals of mutually different frequencies, said signals being arranged in one of a predetermined number of sequences, said signals being characterized by differential phase shift thereof between successive words, the combination comprising:

a plurality of phase detectors for detecting the difference in phase between signals of the same frequency in successive words;

a plurality of frequency selective filters for separating the signals within each sequence;

a plurality of amplitude detectors, each detector generating a detected signal corresponding to the amplitude of the signal separated by said filter, timing means for generating a plurality of timing control signals at times corresponding to the times of occurrence of said input signals;

first means responsive to at least one of said amplitude detected signals and to said timing control signals for generating a sequence indication signal corresponding to the particular one of said predetermined number of sequences corresponding to said received word;

second means responsive to said sequence indication signal and said timing control signals for generating phase detector timing signals;

a sequence decoder responsive to said sequence indication signals for generating a first information component representative of said particular sequence;

a phase decoder coupled to said phase detector for generating a second information component representative of said differential phase shift; and signal combining means for combining said information components to provide an output information signal uniquely corresponding to said received word.

20. The combination according to claim 19, wherein said sequence decoder includes means for generating said generated first information component signal which comprises a plurality of pulses representative of said particular sequence, each pulse corresponding to a binary digit and wherein said phase decoder includes means for generating said second information component signal which comprises a plurality of pulses representative of said differential phase shift, each pulse corresponding to a binary digit.

21. The combination according to claim 19, wherein said plurality of phase detectors comprises:

a plurality of in-phase detectors, one for each of said input signal frequencies, for detecting the cosine of the difference in phase between input signals at the same frequency in successive words;

a plurality of quadrature phase detectors, one for each of said input signal frequencies, for detecting the sine of the difference in phase between input signals at the same frequency in successive words;

first summing means for adding the cosine of the difference in phase between input signals of the same frequency in successive words for all of the input signal frequencies; and second summing means for adding the sine of the difference in phase between input signals of the same frequency in successive words for all of the input signal frequencies.

22. A communication system for transmitting an input information signal from a transmitter station to a receiver station, said input information signal being characterized by a sequence information component and a phase information component, said system comprising:

means at said transmitter station responsive to said sequence information component for generating one of a number of predetermined sequences of a plurality of signal waves of mutually different frequencies, said last-mentioned means including means for arranging said sequences such that the location of one of said signal waves in said predetermined sequence uniquely defines said predetermined sequence;

means at said transmitter station responsive to said phase information component for differentially changing the phase of corresponding signal waves in successively transmitted sequences by a specified amount;

means at said receiver station responsive to at least one of said signal waves and the locations of said signal wave in said predetermined sequence for generating a sequence indication signal corresponding to said sequence information component;

means at said receiver station responsive to said differential change in phase of corresponding signal waves in said successively transmitted sequences for generating a phase indication signal; and means at said receiver station responsive to said sequence indication signal and to said phase indication signal for regenerating said input information signal.

23. A system according to claim 22, further comprising input signal means for providing an input signal which comprises a plurality of pulses, each pulse corresponding to a binary digit, and wherein said sequence information component comprises selected ones of said plurality of binary digits and said phase information component comprises other selected ones of said plurality of binary digits.

24. A system according to claim 22, further comprising input signal means for providing an input signal which corresponds to a series of four binary digits, said information component corresponding to two of said binary digits and said phase information component corresponding to the other two binary digits, there being four predetermined sequences of said signal waves, each one of said four predetermined sequences comprising four signal waves.

25. A communication system for transmitting a given one of a plurality of words from a transmitting station to a receiving station in response to an input information signal, said input information signal being characterized by a sequence information component and a phase information component, said system comprising:

first pulse generating means at said transmitting station responsive to said sequence information component for producing a given number of frequency control pulses arranged in one of a fixed number of predetermined sequences;

second pulse-generating means at said transmitting station responsive to said phase information component for producing at least one phase control pulse;

oscillator means for generating a plurality of transmission signal waves each corresponding to a different frequency;

means for translating said transmission signal waves to a transmission medium;

gating means responsive to said frequency control pulses and to said at least one phase control pulse for sequentially transferring said transmission signal waves to said translating means in an order corresponding to said predetermined sequence, each of said transmission signal waves being translated at a time corresponding to the occurrence of a corresponding one of said frequency control pulses, each of said transmission signal waves having a specified phase with respect to a reference phase, said specified phase being dependent upon said phase control pulse, the location of one of said transmission signal waves within said predetermined sequence uniquely defining said sequence, the location of said one transmission signal wave within said predetermined sequence and the phase shift of said transmission signal wave relative to said reference phase uniquely defining said given word;

second signal-translating means for translating said transmission signal waves from said transmission medium to said receiving station;

a plurality of phase detectors at said receiving station, each phase detector being adapted to determine the difference in phase between successive transmission signal waves of a particular frequency;

a corresponding plurality of frequency selective filters at said receiving station for separating the signals within each sequence;

a corresponding plurality of amplitude detectors at said receiving station, each detector generating a detected signal corresponding to the amplitude of the signal separated by the corresponding one of said filters;

timing means at said receiving station for generating a plurality of timing control signals at times corresponding to the times of occurrence of the signal waves translated from said transmission medium;

first means at said receiving station responsive to at least one of said amplitude detected signals and to said timing control signals for generating a sequence indication signal corresponding to a particular one of said predetermined number of sequences;

second means at said receiving station responsive to said sequence indication signal and to said timing control signals to generate phase detector timing signals;

a sequence decoder at said receiving station responsive to said sequence indication signals for generating a first information signal representative of said particular sequence;

a phase decoder at said receiving station coupled to said phase detector for generating a second information signal representative of said differential phase shift; and signal combining means for combining said first and second information signals to provide an output information signal uniquely corresponding to said given one of said plurality of words.

26. A system according to claim 25, further comprising input signal means for providing an input signal which comprises a plurality of pulses, each pulse corresponding to a binary digit, and wherein said sequence information component comprises selected ones of said plurality of binary digits and said phase information component comprises other selected ones of said plurality of binary digits.

27. A system according to claim 25, further comprising input signal means for providing an input signal which corresponds to a series of four binary digits and wherein said sequence information component corresponds to two of said binary digits and said phase information component corresponds to the other two binary digits, there being four predetermined sequences of said signal waves, each one of said four predetermined sequences comprises four signal waves.

* * * * *

UNITED STATES PATENT OFFICE

CERTIFICATE OF CORRECTION

Patent No. 3,617,889 Dated November 2, 1971

Inventor(s) Jacob Rabinowitz

It is certified that error appears in the above-identified patent and that said Letters Patent are hereby corrected as shown below:

| | |
|---|---|
| Column 2, line 72 | "$R_1$" should be -- $F_1$ -- |
| Column 3, line 62 | "sin" should be -- -sin -- |
| Column 4, line 45 | "shifts, , 90°" should be -- shifts, 0°, 90° -- |
| Column 7, line 60 | "52" should be -- 53 -- |
| Column 11, line 20 | "where is" should be -- where Φ is -- |
| Column 11, line 62 | "355" should be -- 366 -- |
| Column 12, line 22 | "( $_B$ - $\Phi_A$)" should be -- ($\Phi_B$ - $\Phi_A$) -- |

Signed and sealed this 27th day of June 1972.

(SEAL)
Attest:

EDWARD M.FLETCHER,JR.
Attesting Officer

ROBERT GOTTSCHALK
Commissioner of Patents